United States Patent
Matsubara et al.

[11] Patent Number: 5,993,042
[45] Date of Patent: Nov. 30, 1999

[54] NUMERICAL CONTROL APPARATUS FOR MACHINING A WORKPIECE

[75] Inventors: Susumu Matsubara; Kenji Iriguchi; Kiyotaka Kato, all of Tokyo, Japan

[73] Assignee: Mitsubishi Denki Kabushiki Kaisha, Tokyo, Japan

[21] Appl. No.: 08/964,221

[22] Filed: Nov. 4, 1997

[30] Foreign Application Priority Data

Nov. 8, 1996 [JP] Japan ................................ 8-296504

[51] Int. Cl.⁶ ................ G05B 19/4097; G05B 19/4099; G05B 19/4093
[52] U.S. Cl. .................. 364/468.25; 364/474.24; 364/474.25; 364/474.29; 364/474.28
[58] Field of Search ................... 364/474.29, 474.24, 364/474.21, 474.28, 474.25, 468.25; 318/569, 572, 565, 568

[56] References Cited

U.S. PATENT DOCUMENTS

| | | | |
|---|---|---|---|
| 4,496,889 | 1/1985 | Fukuyama et al. | 318/565 |
| 4,506,331 | 3/1985 | Kishi et al. | 364/474 |
| 4,572,998 | 2/1986 | Nozawa et al. | 318/572 |
| 4,736,306 | 4/1988 | Christensen et al. | 364/513 |
| 5,224,049 | 6/1993 | Mushabac | 364/474.05 |
| 5,347,454 | 9/1994 | Mushabac | 364/413 |
| 5,351,196 | 9/1994 | Sowar et al. | 364/474.24 |
| 5,754,433 | 5/1998 | Fukui et al. | 364/474.24 |
| 5,801,709 | 6/1998 | Suzuki et al. | 345/433 |

FOREIGN PATENT DOCUMENTS

| | | | |
|---|---|---|---|
| 3-1201 | 1/1991 | Japan | G05B 19/405 |
| 3-46007 | 2/1991 | Japan | G05B 19/403 |
| 7-182019 | 7/1995 | Japan | G05B 19/4097 |

*Primary Examiner*—William Grant
*Assistant Examiner*—Iván Calcaño
*Attorney, Agent, or Firm*—Sughrue, Mion, Zinn, Macpeak & Seas, PLLC

[57] ABSTRACT

A numerical control apparatus allows for the machining of a workpiece based on a three-dimensional work shape which is inputted. The shape of the workpiece is set and the shape of the workpiece and three-dimensional work shape determine the work region to be extracted. The extracted work region is divided into work regions of spot work, contour work, and region work by the characteristics of the work. The work order is set to determine the order in which the divided work regions are to be machined. The work information for each work region is then inputted and command data used in moving a tool is generated from the work order data and the work information.

13 Claims, 31 Drawing Sheets

φ10 FLAT END MILL (POCKET (1)) → φ5 FLAT END MILL (POCKET (1)) →
φ10 FLAT END MILL (POCKET (2)) → φ5 FLAT END MILL (POCKET (2)) →
φ10 DRILLING END MILL (CURVED SURFACE) →
φ5 DRILLING END MILL (CURVED SURFACE) → SPOT φ2 (THROUGH-HOLE (1)) →
SPOT φ2 (THROUGH-HOLE (2)) → SPOT φ2 (THROUGH-HOLE (3)) →
SPOT φ5 (THROUGH-HOLE (1)) → SPOT φ5 DRILL (THROUGH-HOLE (2)) →
SPOT φ5 DRILL (THROUGH-HOLE (3)) →

NUMERICAL CONTROL APPARATUS FOR MACHINING A WORKPIECE

BACKGROUND OF THE INVENTION

The present invention relates to a numerical control apparatus to control a machine tool and robot in accordance with numerical data.

Recently, in accordance with the progress of computers and peripheral equipment, the shape data is used when tool moving command data is generated in a machine tool. Examples of using the shape data are described as follows. In the Unexamined Japanese Patent Application Publication Nos. Hei 3-1201 and Hei 3-46007, there is disclosed a system in which the shape of a workpiece and the moving command data of a tool are inputted, and the changed shape of the workpiece is displayed in accordance with the moving command data of the tool, so that the moving data of the tool can be confirmed. Also, in the Unexamined Japanese Patent Application Publication No. Hei 7-182019, there is disclosed a system in which consideration is given to a restoration of the shape of the workpiece before machining.

In the above NC information making system incorporated into the conventional numerical control apparatus, the shape data is utilized, however, there is provided no system in which the three-dimensional shape to be machined is inputted and the tool moving command data is directly generated by this three-dimensional shape to be machined.

The present invention has been accomplished to solve the above problems. It is an object of the present invention to provide a numerical control apparatus capable of directly generating the tool moving command data by the three-dimensional shape of a workpiece to be machined.

According to the first aspect of the present invention, there is provided a numerical control apparatus in which the inputted numerical data is decoded, each section of the numerical control apparatus is controlled in accordance with the result of decoding, and a workpiece is machined according to the numerical data, comprising: a shape inputting means for inputting a three-dimensional shape to be machined; a workpiece shape setting means for setting the shape of a workpiece; a work region extracting means for extracting a work region by the three-dimensional shape to be machined inputted by the shape inputting means and by the shape of the workpiece which has been set by the workpiece shape setting means; a work region dividing means for dividing the work region extracted by the work region extracting means; a work order setting means for setting the order of machining the work regions divided by the work region dividing means; a work information inputting means for inputting the work information of each work region; and a tool moving command data generating means for generating the tool moving command data by the order of machining in each work region and the work information.

According to the second aspect of the present invention, there is provided a numerical control apparatus, the work region dividing means including a work region work characteristic dividing means for dividing the work region into a spot work, a contour work and a region work in accordance with the characteristic of the work region.

According to the third aspect of the present invention, there is provided a numerical control apparatus, the work region dividing means including: a work region fractionalizing means for fractionalizing the work region by the characteristic of the three-dimensional work shape inputted by the shape inputting means; and a region combining means for arbitrarily combining the regions divided by the work region fractionalizing means.

According to the forth aspect of the present invention, there is provided a numerical control apparatus, wherein the work region fractionalizing means extends the surfaces composing the three-dimensional work shape inputted by the shape inputting means and divides the work region when the extended surface interfering with the work region extracted by the work region extracting means is used as a boundary.

According to the fifth aspect of the present invention, there is provided a numerical control apparatus, the work region dividing means including a work region arbitrarily dividing means for arbitrarily dividing the work region.

According to the sixth aspect of the present invention, there is provided a numerical control apparatus, the work region dividing means including a work region arbitrarily dividing means for arbitrarily dividing the work region in accordance with the shape of the work region.

According to the seventh aspect of the present invention, there is provided a numerical control apparatus, the work region arbitrarily dividing means including: a plane generating means for generating a plane; a plane operating means for arbitrarily moving and turning a plane generated by the plane generating means; and a dividing means for dividing the work region when the plane which has been set by the plane generating means and the plane operating means is used as a boundary.

According to the eighth aspect of the present invention, there is provided a numerical control apparatus, the work region arbitrarily dividing means including: a rectangular parallelepiped generating means for generating a rectangular parallelepiped; a rectangular parallelepiped operating means for arbitrarily moving and turning the rectangular parallelepiped generated by the rectangular parallelepiped generating means; a common section calculating means for calculating a common section between the rectangular parallelepiped which has been set by the rectangular parallelepiped operating means and the work region; and a dividing means for dividing the work region in the common section.

According to the ninth aspect of the present invention, there is provided a numerical control apparatus, the work region arbitrarily dividing means including: a line generating means for generating an arbitrary line; a surface generating means for generating an arbitrary surface with respect to the line generated by the line generating means; a surface operating means for moving and turning the surface generated by the surface generating means; and a dividing means for dividing the work region when the surface which has been set by the surface operating means is used as a boundary surface.

According to the tenth aspect of the present invention, there is provided a numerical control apparatus, the workpiece shape setting means including a rectangular parallelepiped generating means for generating a rectangular parallelepiped containing the overall three-dimensional workpiece shape by the three-dimensional work shape inputted by the shape inputting means, wherein the work region extracting means extracts a work region by subtracting the three-dimensional work shape from the rectangular parallelepiped generated by the rectangular parallelepiped generating means.

According to the eleventh aspect of the present invention, there is provided a numerical control apparatus, further comprising: a shape display means for calculating and displaying a change in the shape of the workpiece at any time when the tool is moved in accordance with the generated tool moving command data; a region correcting means for arbitrarily correcting the work region; a work order correcting means for correcting the order of work; a work information correcting means for correcting the work information; and a tool moving command data regenerating means for regenerating the tool moving command data in accordance with the corrected work order of the regions to be machined and also in accordance with the work information.

According to the twelfth aspect of the present invention, there is provided a numerical control apparatus, further comprising: a shape change calculating means for calculating a change in the shape of the workpiece at any time when the tool is moved in accordance with the generated tool moving command data; a work surface height calculating means for calculating a height of the work surface in the work region next, in accordance with the shape calculated by the shape change calculating means; and a work depth calculating means for calculating the work depth of the work region to be machined next, in accordance with the shape calculated by the shape change calculating means.

DETAILED DESCRIPTION OF THE PREFERRED EMBODIMENTS (EMBODIMENT 1)

Referring to the accompanying drawings, an embodiment of the present invention will be explained as follows.

Figure 1:
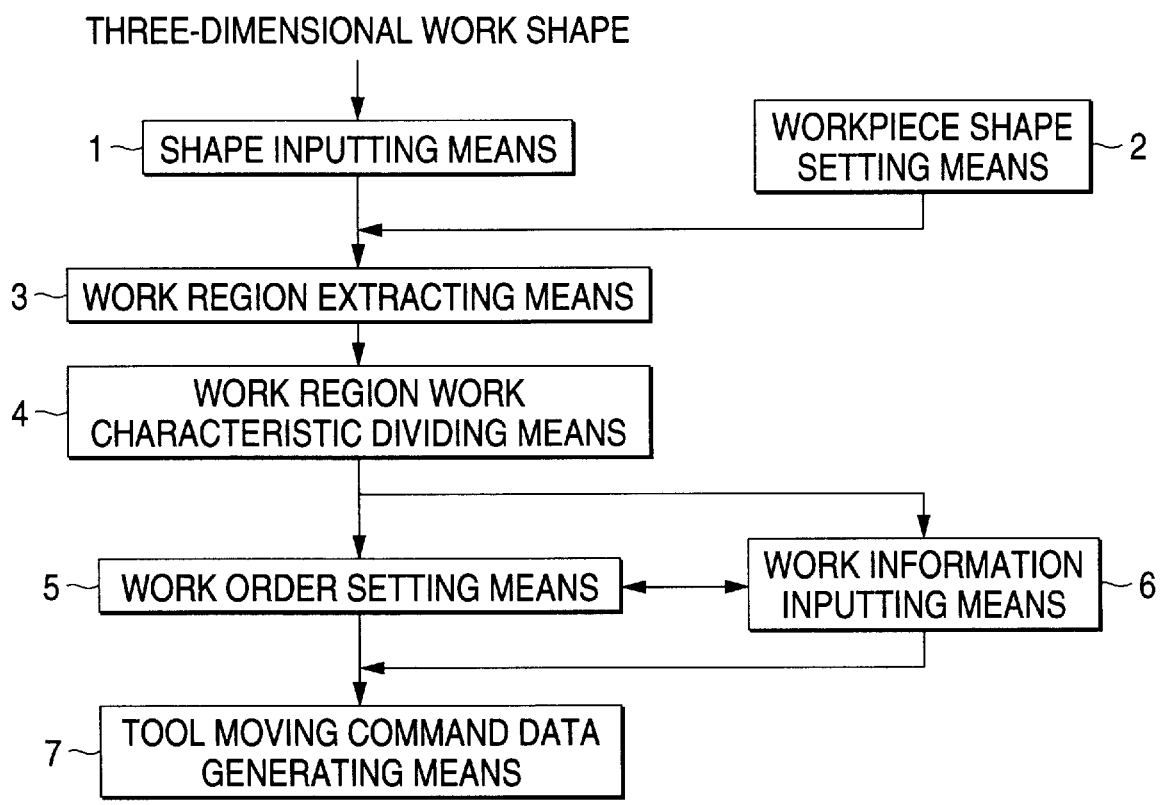
FIG. 1 is a block diagram showing a structure of the primary section of the numerical control apparatus of Embodiment 1 of the present invention.

FIG. 1 is a block diagram showing a structure of the numerical control apparatus of Embodiment 1 of the present invention. In the block diagram, reference numeral 1 is a shape inputting means for inputting a three-dimensional work shape. Reference numeral 2 is a workpiece shape setting means for setting the shape of a workpiece. Reference numeral 3 is a work region extracting means for extracting a work region in accordance with a shape obtained by the shape inputting means 1 and the workpiece shape setting means 2. Reference numeral 4 is a work region work characteristic dividing means for dividing the work region obtained by the work region extracting means 3 in accordance with the characteristic of work. Reference numeral 5 is a work order setting means for setting the order of work in the region divided by the work region work characteristic dividing means 4. Reference numeral 6 is a work information inputting means for inputting the work information of the region divided by the work region work characteristic dividing means 4. Reference numeral 7 is a tool moving command data generating means for generating the tool moving command data in accordance with the work order and the work information obtained by the work order setting means 5 and the work information inputting means 6 with respect to the work region obtained by the work region work characteristic dividing means 6.

Figure 2:
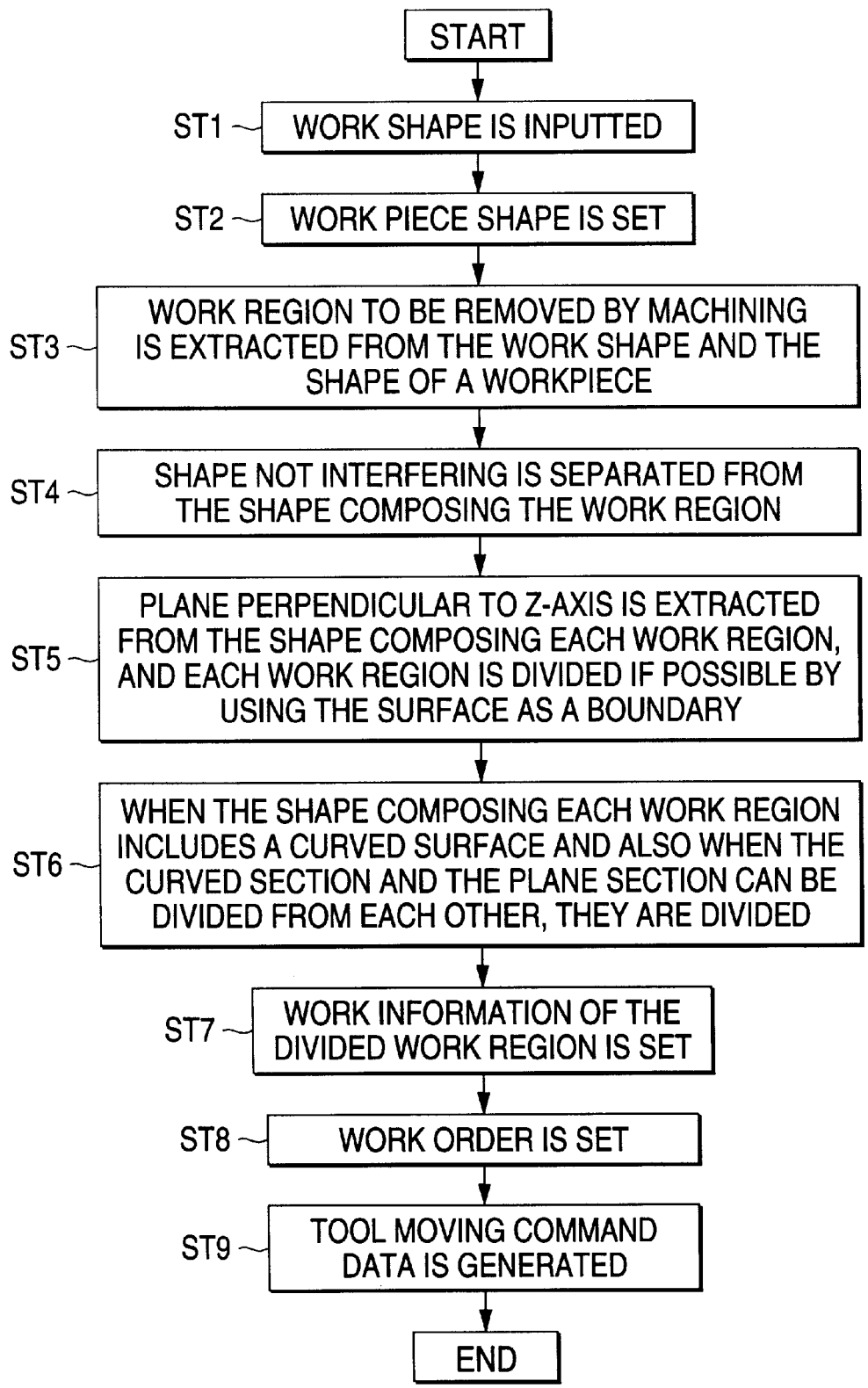
FIG. 2 is a flow chart showing an operation of the numerical control apparatus of Embodiment 1 of the present invention.

FIG. 2 is a flow chart showing the operation of this numerical control apparatus. FIGS. 3, 4 and 5 are schematic illustrations for specifically explaining the operation shown on the flow chart of FIG. 2.

Figure 3A:
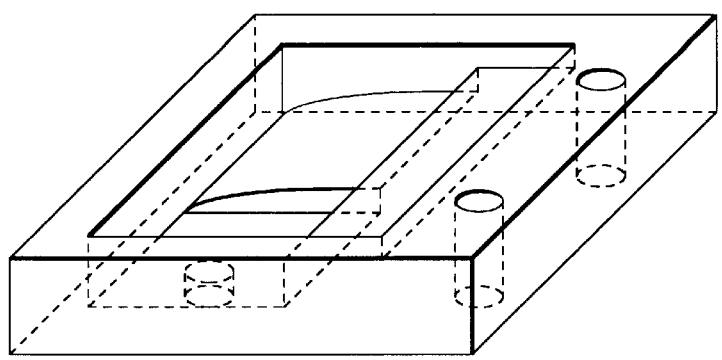
FIGS. 3A to 3D are schematic illustration specifically showing an operation of the numerical control apparatus of Embodiment 1 of the present invention.
Figure 3B:
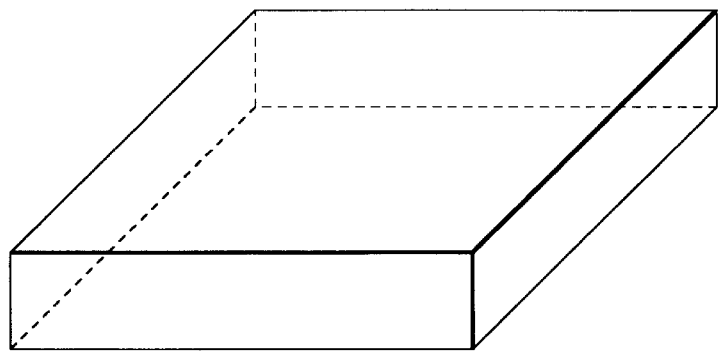
Figure 3C:
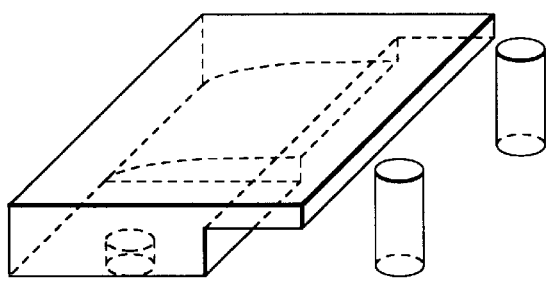
Figure 3D:
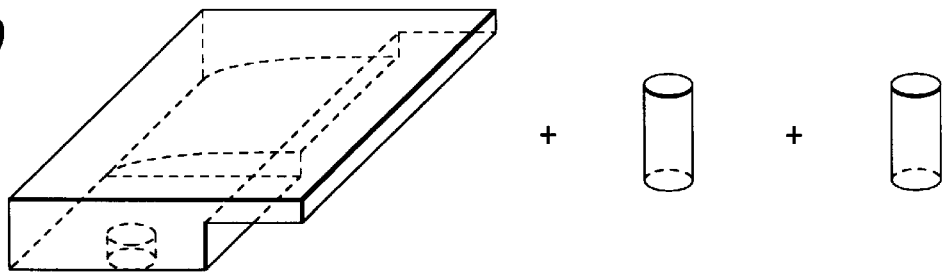
Figure 4E:
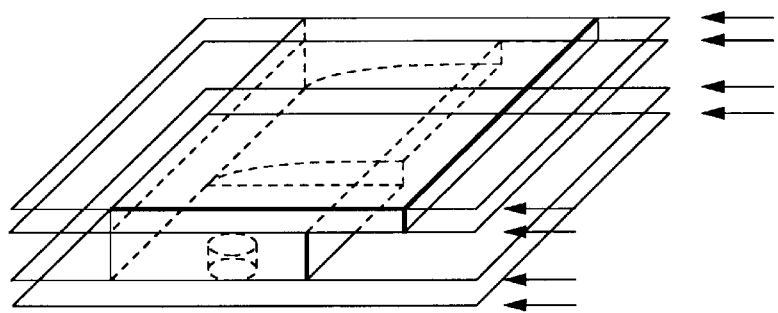
FIGS. 4E to 4H are schematic illustration specifically showing an operation of the numerical control apparatus of Embodiment 1 of the present invention.
Figure 4F:
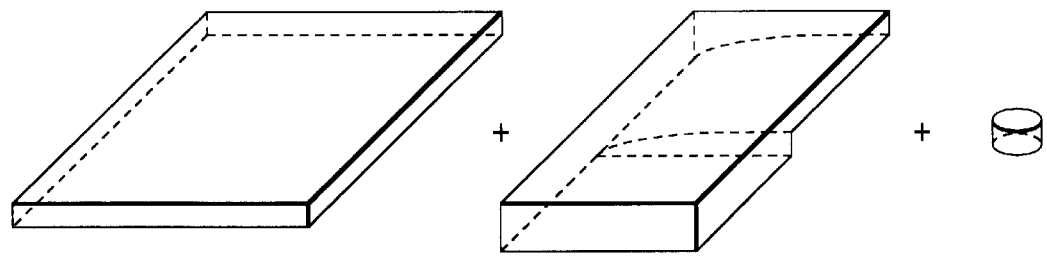
Figure 4G:
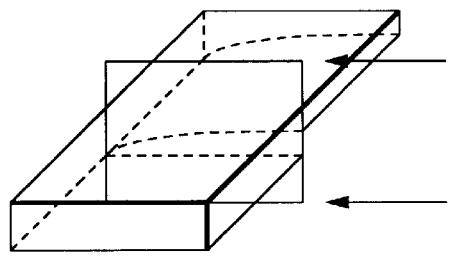
Figure 4H:
Figures 5A, 5B:
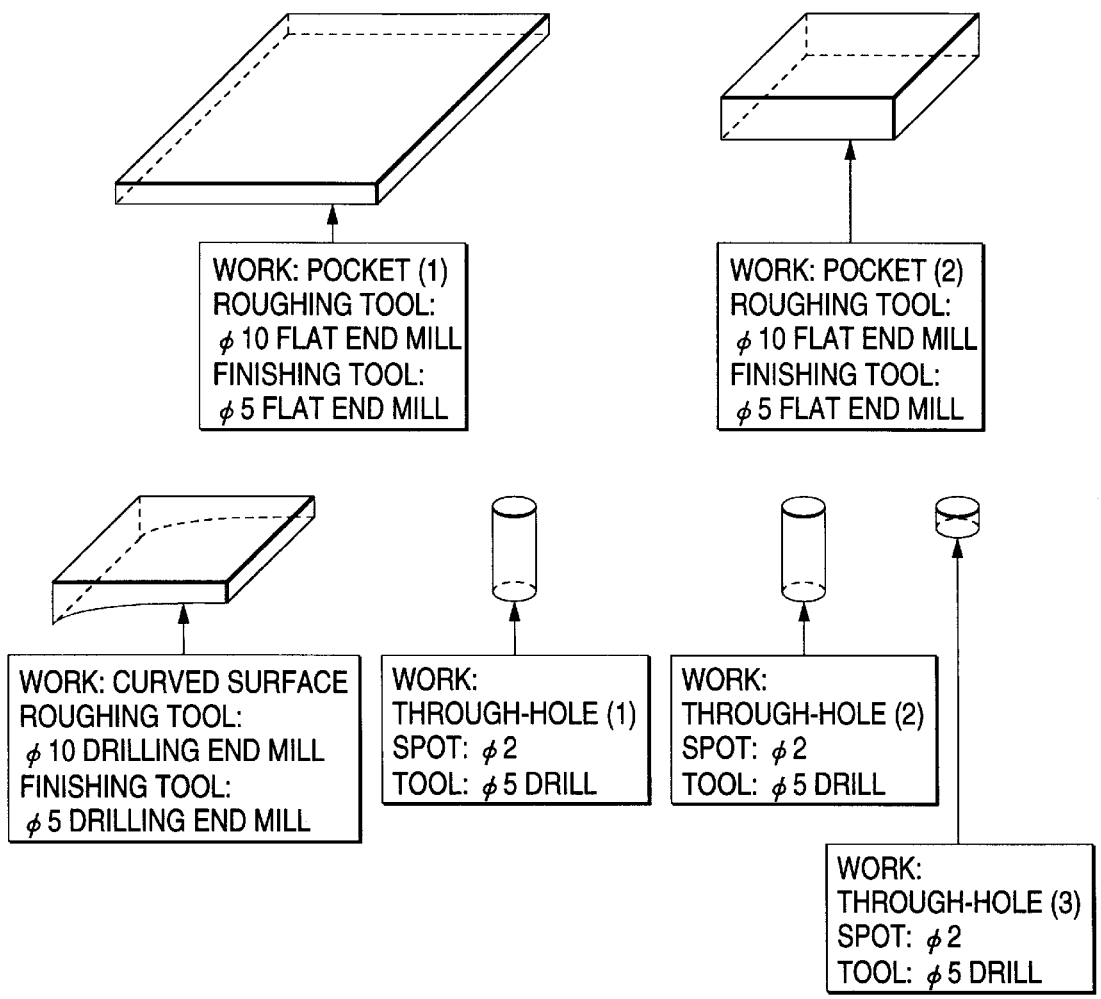
FIGS. 5A and 5B are schematic illustration specifically showing an operation of the numerical control apparatus of Embodiment 1 of the present invention.

Next, the operation will be explained as follows. In the flow chart of FIG. 2, first, the three-dimensional shape to be machined is inputted (Step ST1). This state is shown in FIG. 3A. Next, the shape of the workpiece is set (Step ST2). This state is shown in FIG. 3B. Then, a work region to be removed by machining is extracted by conducting a subtraction in which the aforementioned work shape is subtracted from the inputted shape of the workpiece (Step ST3). This state is shown in FIG. 3C. When the shapes of the work regions which have been extracted in this way are separate from each other and no shapes of the work regions interfere with each other, the work regions are divided in accordance with the characteristics of the types of work such as spot work of forming holes, contour work of forming grooves and region work of forming a plane or curved surface (Step ST4). This state is shown in FIG. 3D. Further, a plane perpendicular to Z-axis is extracted from the shape forming each work region which has been divided, and the work region is divided if possible when the surface is used as a boundary (Step ST5). This state is shown in FIGS. 4E and 4F. When the divided work surface contains a curved surface and both curved surface work and plane surface work are conducted, the curved surface section and the plane surface section are divided from each other if possible (Step ST6). This state is shown in FIGS. 4G and 4H. Successively, the work information of each work region which has been divided is set (Step ST7). This state is shown in FIG. 5A. Next, the work order is set in accordance with the work information (Step ST8). This state is shown in FIG. 5B. Then, the tool moving command data is generated by the aforementioned work order and the work information (Step ST9).

As described above, according to Embodiment 1, when the tool moving command data is generated, the work region is extracted from the three-dimensional work shape and divided in accordance with the characteristic of work conducted in the obtained work region. Accordingly, the work information can be effectively set, and the tool moving command data can be effectively generated.

(EMBODIMENT 2)

Figure 6:
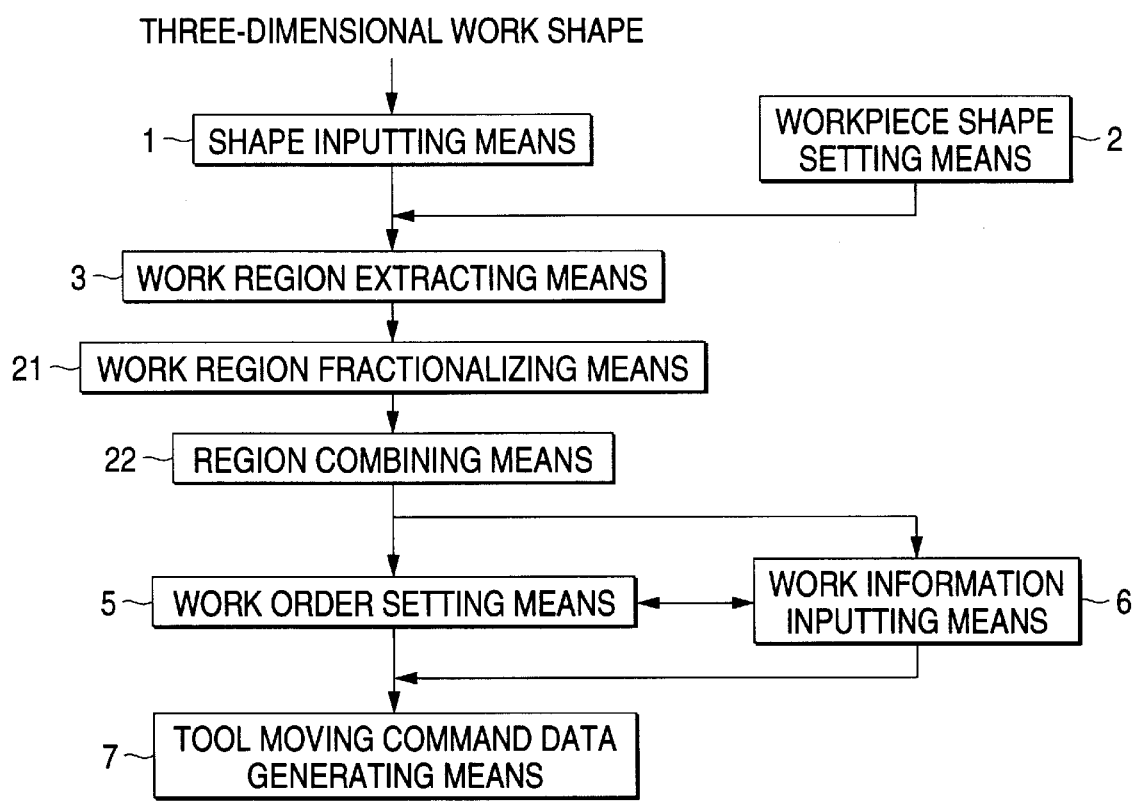
FIG. 6 is a block diagram showing a structure of the primary section of the numerical control apparatus of Embodiment 2 of the present invention.

FIG. 6 is a block diagram showing a structure of the primary section of the numerical control apparatus of Embodiment 2 of the present invention. Like reference characters are used to indicate like parts in FIGS. 1 and 6, and the same explanations are omitted here. Reference numeral 21 is a work region fractionalizing means for fractionalize the work region extracted by the work region extracting means 3, at a characteristic portion of the three-dimensional work shape inputted by the shape inputting means 1. Reference numeral 22 is a region combining means for arbitrarily combining the regions fractionalized by the work region fractionalizing means 21.

Figure 7:
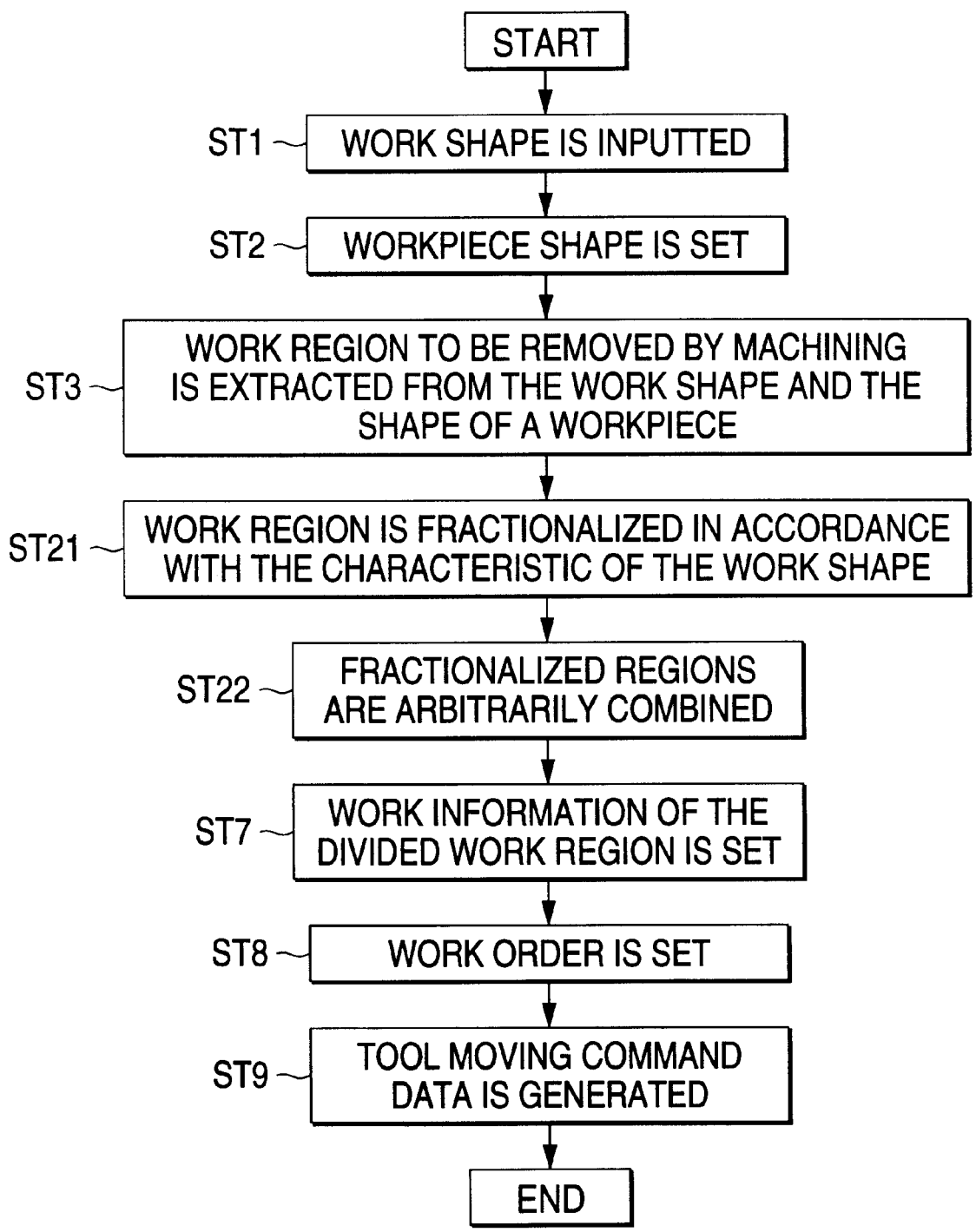
FIG. 7 is a flow chart showing an operation of the numerical control apparatus of Embodiment 2 of the present invention.

FIG. 7 is a flow chart showing the operation of this numerical control apparatus. Like reference characters are used to indicate like parts in FIGS. 2 and 7, and the same explanations are omitted here. FIG. 8 is a schematic illustration for specifically explaining the operation shown in the flow chart of FIG. 7. In the same manner as that of FIGS. 3A, 3B and 3C, FIGS. 8A, 8B, and 8C show a three-dimensional work shape, a shape of the workpiece and a work region which has been extracted.

Figure 8A:
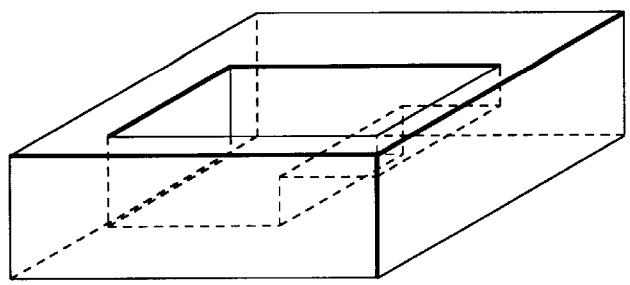
FIGS. 8A to 8E are schematic illustration specifically showing an operation of the numerical control apparatus of Embodiment 2 of the present invention.
Figure 8B:
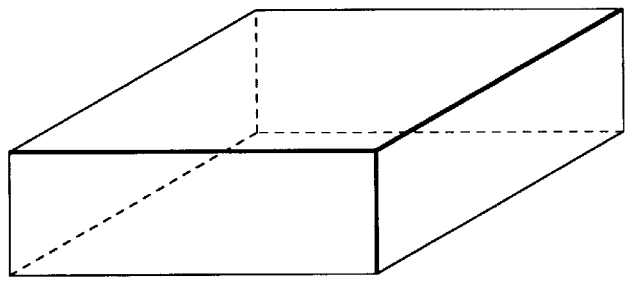
Figure 8C:
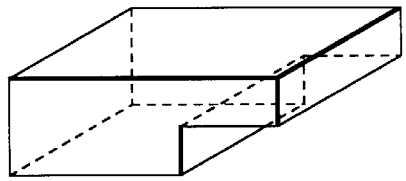
Figure 8D:
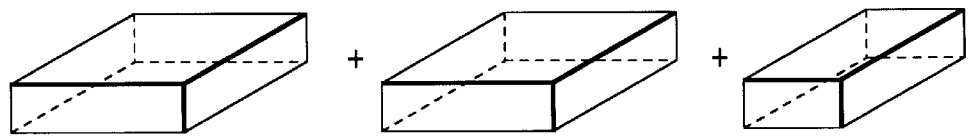

Next, the operation will be explained as follows. In the flow chart shown in FIG. 7, the work region (shown in FIG. 8C), which has been extracted in Step ST3, is fractionalized in accordance with the characteristic shape portion of the three-dimensional work shape (Step ST21). This state is shown in FIG. 8D. An example of the method of fractionalization is described as follows. When each extended surface of the three-dimensional work shape interferes with the work region extracted by the work region extracting means 3, the work region is divided when the extended surface is used as a boundary.

Figure 9:
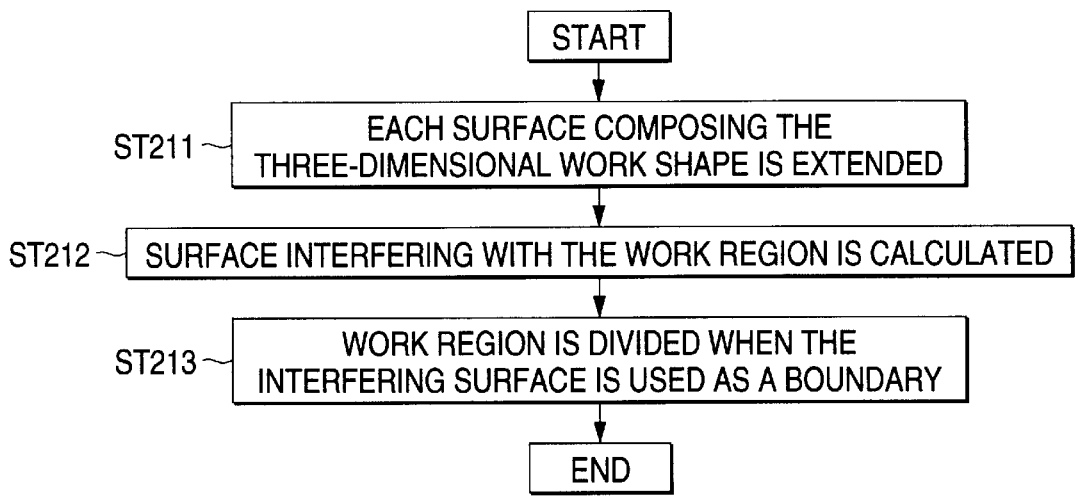
FIG. 9 is a flow chart showing an operation of the work region fractionalizing means of Embodiment 2 of the present invention.

FIG. 9 is a flow chart showing the operation of the work region fractionalizing means 21. In FIG. 9, all surfaces of the three-dimensional work shape inputted in Step ST1 shown in FIG. 7 are extended (Step ST211). Then, a calculation is conducted to find an interference between the surfaces extended in Step ST211 and the work region extracted in Step ST3 in FIG. 7. As a result of the calculation, when it is found that an interference occurs, the extracted work region is divided when the surface of interference is used as a boundary (Step ST213).

Figure 8E:
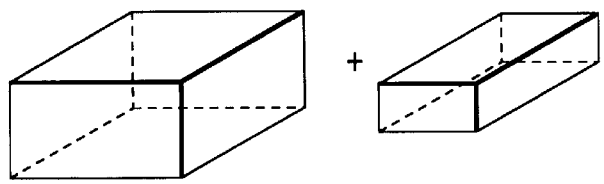

Next, the shapes divided in Step ST21 are arbitrarily combined with each other according to the preference of an operator (Step ST22). This state is shown in FIG. 8E. With respect to the thus combined work region, the tool moving command data is generated in the same manner as that of Embodiment 1.

As described above, according to Embodiment 2, the tool moving command data can be generated as follows. The work region is extracted from the three-dimensional work shape. The thus obtained work region is fractionalized in accordance with the work shape and arbitrarily combined with each other. Due to the foregoing, it is possible to generate the tool moving command data of high degree of freedom in accordance with the preference of an operator.

(EMBODIMENT 3)

Figure 10:
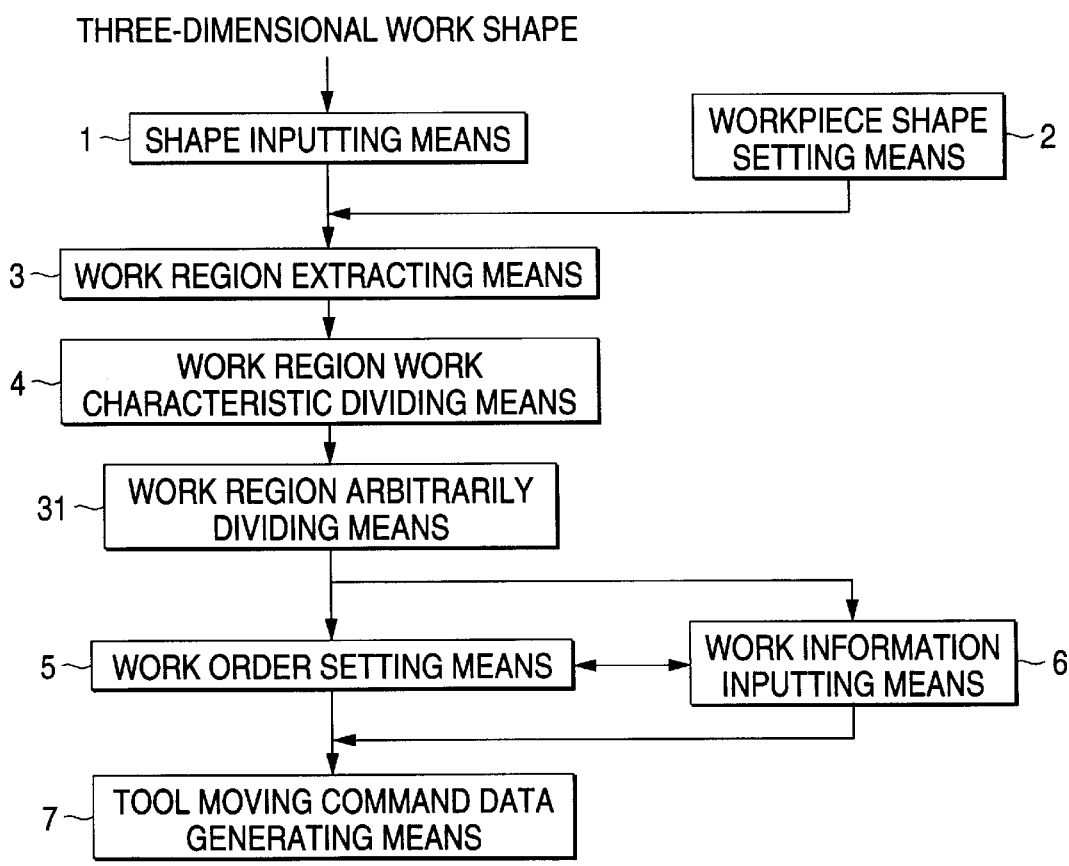
FIG. 10 is a block diagram showing a structure of the primary section of the numerical control apparatus of Embodiment 3 the present invention.

FIG. 10 is a block diagram showing the structure of the primary section of the numerical control apparatus of Embodiment 3 of the present invention. Like reference characters are used to indicate like parts in FIGS. 1 and 10, and the same explanations are omitted here. Reference numeral 31 is a work region arbitrarily dividing means for arbitrarily dividing the region divided by the work region work characteristic dividing means 4.

Figure 11:
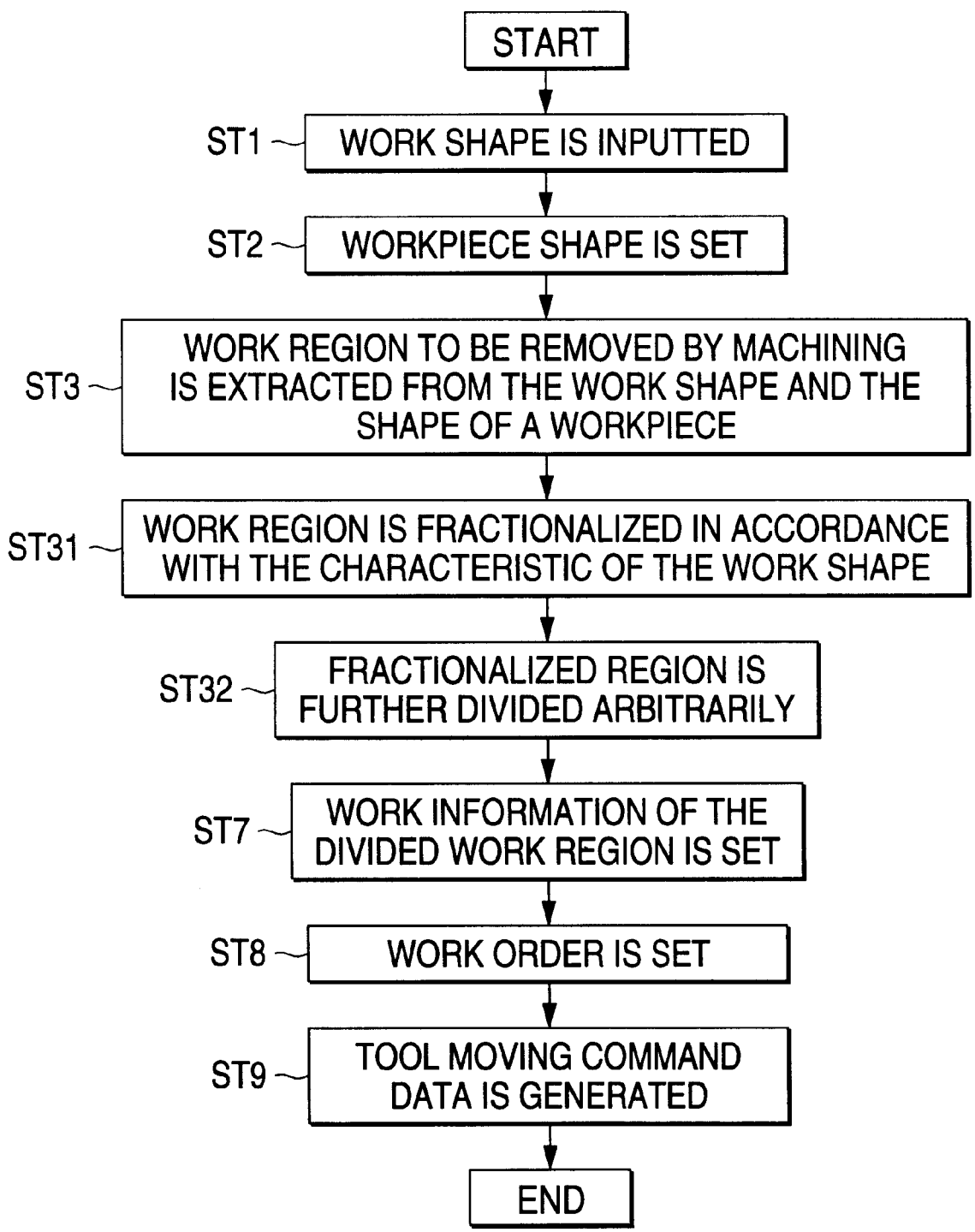
FIG. 11 is a flow chart showing an operation of the numerical control apparatus of Embodiment 3 of the present invention.

FIG. 11 is a flow chart showing the operation of this numerical control apparatus. Like reference characters are used to indicate like parts in FIGS. 2 and 11, and the same explanations are omitted here. FIG. 12 is a schematic illustration specifically showing the operation of the flow chart of FIG. 11. In the same manner as that shown in FIGS. 3A, 3B and 3C, FIGS. 12A, 12B, and 12C respectively show a three-dimensional work shape, a shape of the workpiece and work regions that have been divided.

Figure 12A:
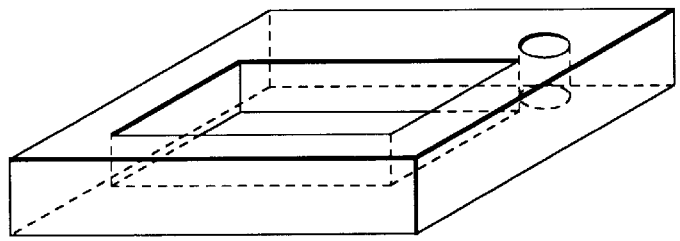
FIGS. 12A to 12D are schematic illustration specifically showing an operation of the numerical control apparatus of Embodiment 3 of the present invention.
Figure 12B:
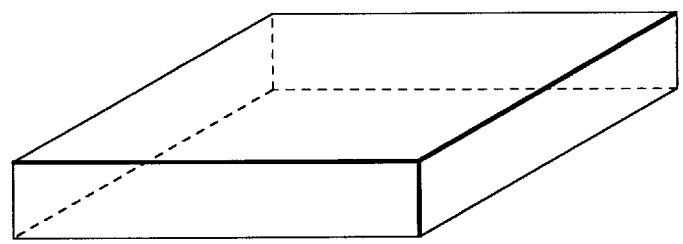
Figure 12C:
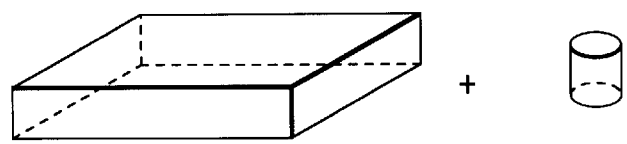
Figure 12D:
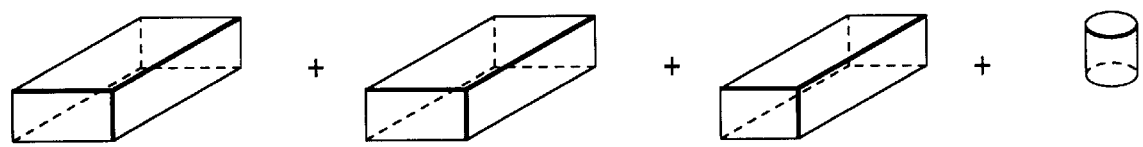

Next, the operation will be explained as follows. In the flow chart shown in FIG. 11, in step ST31, the work region is divided in accordance with the characteristic of work in the same manner as that of Embodiment 1. In Step ST32, the work region divided in Step ST31 is further arbitrarily divided. This state is shown in FIG. 12D. With respect to the finally divided regions, the tool moving command data is generated in the same manner as that of Embodiment 1.

As described above, according to Embodiment 3, when the tool moving command data is generated, the work region is extracted from the three-dimensional work shape, and the thus obtained work region is divided in accordance with the characteristic of work and further divided. Due to the foregoing, it is possible to generate the effective tool moving command data, and it is also possible to generate the tool moving command data of high degree of freedom in accordance with the preference of an operator.

(EMBODIMENT 4)

Figure 13:
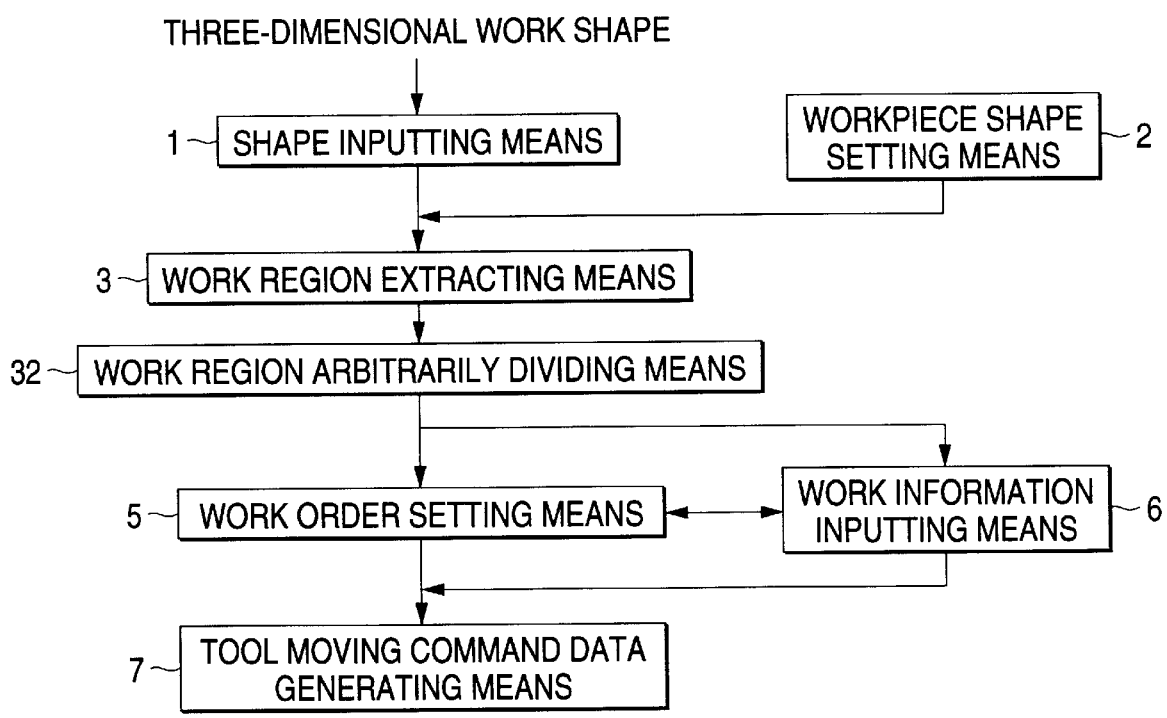
FIG. 13 is a block diagram showing a structure of the primary section of the numerical control apparatus of Embodiment 4 of the present invention.

FIG. 13 is a block diagram showing the structure of the primary section of the numerical control apparatus of Embodiment 4 of the present invention. This embodiment can be applied to various cases of work such as a case in which only one surface is restricted and machined. Like reference characters are used to indicate like parts in FIGS. 1 and 13, and the same explanations are omitted here. Reference numeral 32 is a work region arbitrarily dividing means for arbitrarily dividing the work region extracted by the work region extracting means 3.

Figure 14:
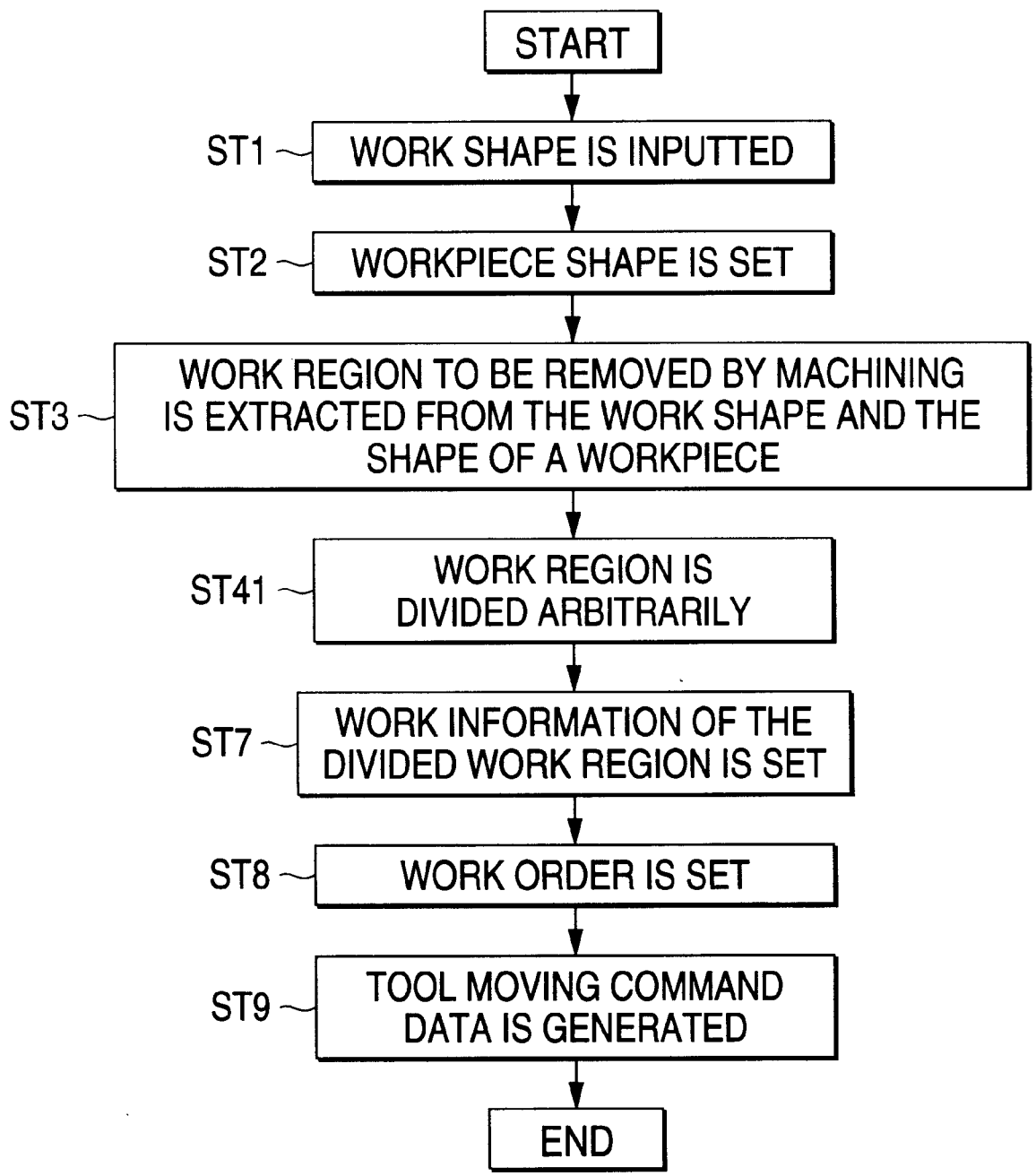
FIG. 14 is a flow chart showing an operation of the numerical control apparatus of Embodiment 4 of the present invention.

FIG. 14 is a flow chart showing the operation of this numerical control apparatus. Like reference characters are used to indicate like parts in FIGS. 2 and 14, and the same explanations are omitted here. FIGS. 15 and 16 are schematic no illustrations specifically showing the operation of the flow chart of FIG. 14. In the same manner as that shown in FIGS. 3A, 3B, and 3C, FIGS. 15A, 15B, and 15C respectively show a three-dimensional work shape, a shape of the workpiece and divided work regions that have been divided.

Figure 15A:
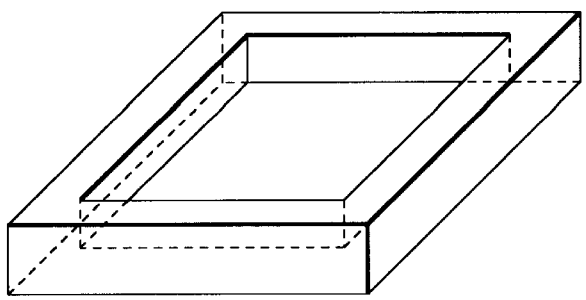
FIGS. 15A to 15E are schematic illustration specifically showing an operation of the numerical control apparatus of Embodiment 4 of the present invention.
Figure 15B:
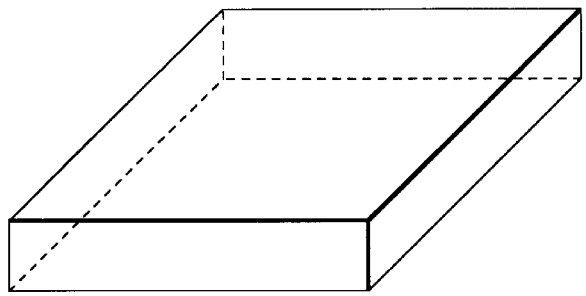
Figure 15C:
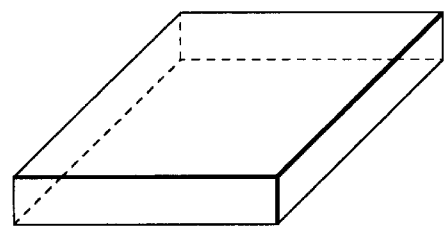
Figure 15D:
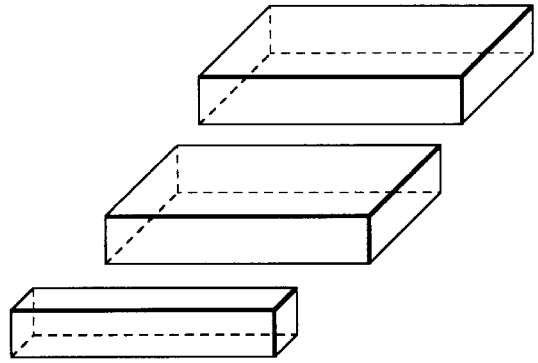
Figure 15E:
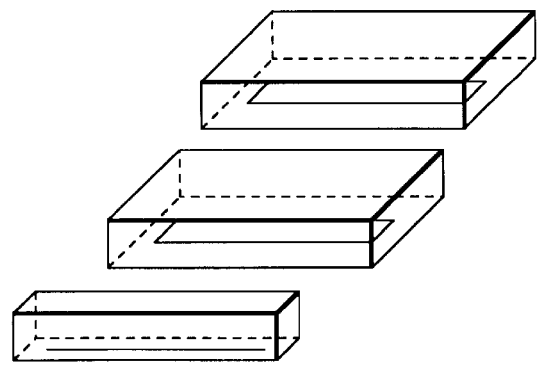
Figure 16A:
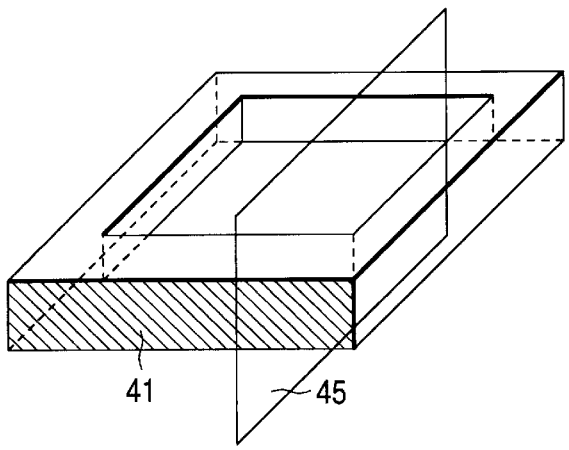
FIGS. 16A to 16E are schematic illustration specifically showing an operation of the numerical control apparatus of Embodiment 4 of the present invention.
Figure 16B:
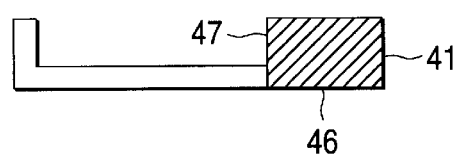

Next, the operation will be explained as follows. In the flow chart shown in FIG. 14, in step ST41, the work region extracted in Step ST3 is arbitrarily divided. This state is shown in FIG. 15D. In Step ST7, the work information is set, and in Step ST8, the work order is set. In Step ST9, the tool moving command data is generated. FIG. 15E shows this state. The shape in the middle of machining in this case is shown in FIG. 16A. In FIG. 16, reference numeral 41 is a surface restricted in the process of machining. Other surfaces except for the surface 41 are not restricted. In this embodiment, the work region is arbitrarily divided, and the regions to be machined are successively machined in the order of a surface distant from the restricted surface to a surface close to the restricted surface. Accordingly, a cross-section of the workpiece taken on the plane indicated by reference numeral 45 in FIG. 16A becomes a cross-section illustrated in FIG. 16B. On the cross-section illustrated in FIG. 16B, a portion indicated by reference numeral 46 in FIG. 16B is not machined being left and the thickness is large. Therefore, when a portion indicated by reference numeral 47 illustrated in FIG. 16B is machined, this portion 47 is maintained in a stable condition.

Figure 16C:
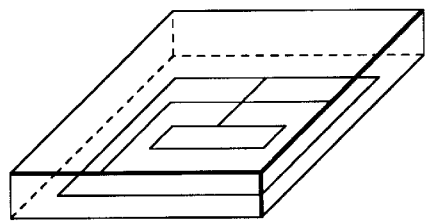
Figure 16D:
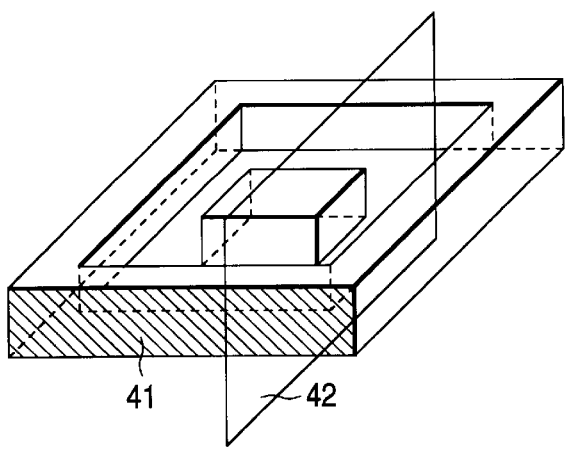
Figure 16E:
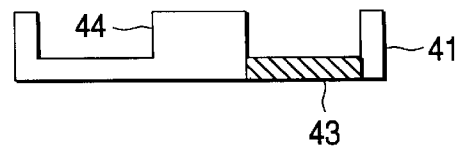

On the other hand, in the flow chart of FIG. 14, the processing of dividing the work region shown in Step ST41 is not conducted, and the work information is set with respect to the extracted work region (Step ST7). Then the order of machining is set (Step ST8). In the case of generating the tool moving command data (Step ST9), for example, the data shown in FIG. 16C is generated. A shape in the middle of machining is shown in FIG. 16D. In FIG. 16D, reference numeral 41 is a surface restricted in the process of machining. Other surfaces except for the surface 41 are not restricted. A cross-section of the workpiece taken on the plane indicated by reference numeral 42 in FIG. 16D becomes a cross-section illustrated in FIG. 16E. When the cross-section is formed as shown in FIG. 16E, a portion indicated by reference numeral 43 becomes thin. When the portion 41 shown in FIG. 16D is restricted and the portion 44 shown in FIG. 16E is machined, there is a possibility that work becomes unstable.

Therefore, according to this embodiment, when the work region is extracted from the three-dimensional work shape and the thus extracted work region is arbitrarily divided so as to generate the tool moving command data, it is possible to stably conduct machining.

(EMBODIMENT 5)

Figure 17A:
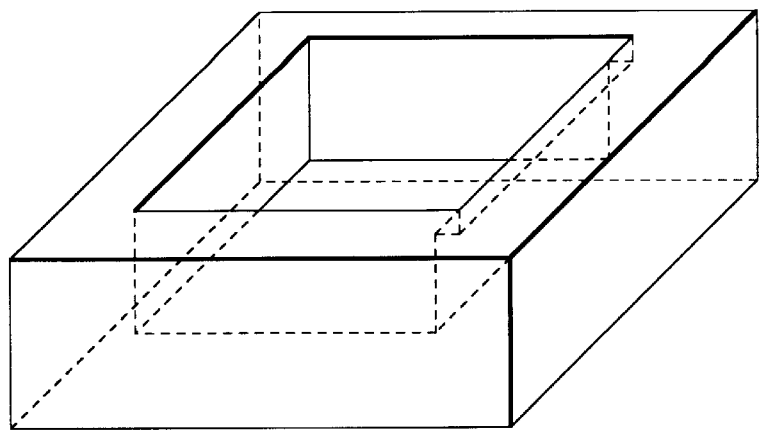
FIGS. 17A to 17D are schematic illustration specifically showing an operation of the numerical control apparatus of Embodiment 5 of the present invention.
Figure 17B:
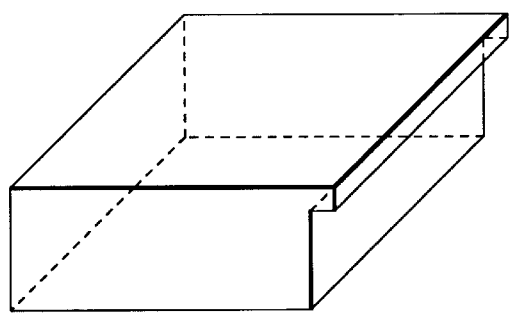
Figure 17C:
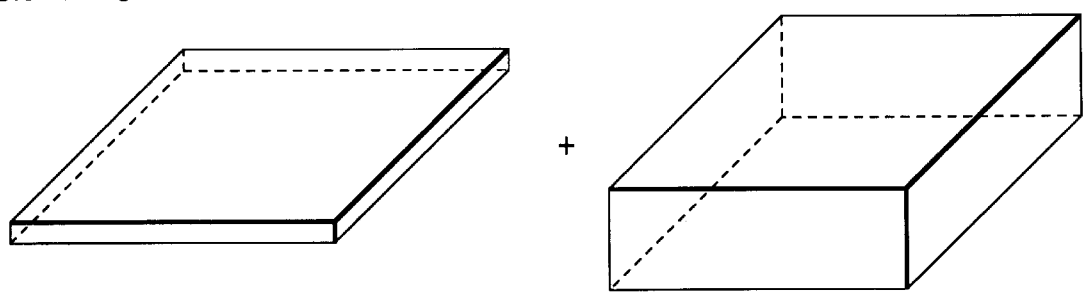
Figure 17D:
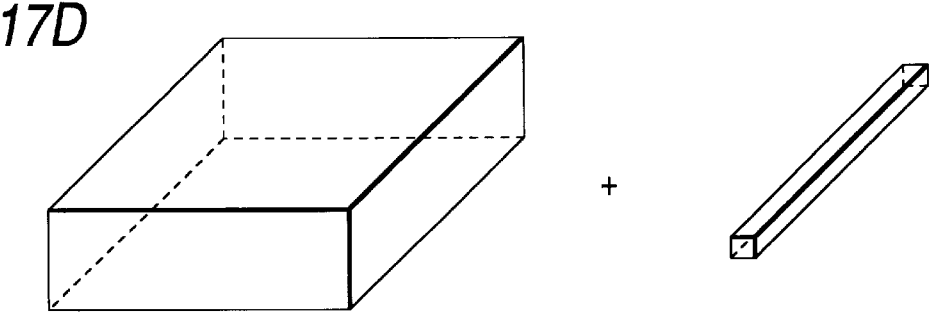

The following embodiments are explained above. Embodiments 1 and 3 are cases in which the work region is divided in accordance with the characteristic of work. Embodiment 2 is a case in which the work region is fractionalized and then combined arbitrarily. Embodiment 4 is a case in which the work region is arbitrarily divided irrespective of the work shape. However, the work region may be arbitrarily divided in accordance with the shape of the work region. FIG. 17 is a schematic illustration for explaining an example of division of the work region in the numerical control apparatus of Embodiment 5. In this connection, the structure and operation of the apparatus of FIG. 17 are the same as those of FIGS. 13 and 14. In FIG. 17, FIG. 17A is a view showing a three-dimensional work shape, and FIG. 17B is a view showing an extracted work region. In FIG. 17, FIG. 17C is a view showing each work region in the case of dividing the extracted region at a portion where the shape is changed, using a plane in the horizontal direction. In FIG. 17, FIG. 17D is a view showing each work region in the case of dividing the extracted region at a portion where the shape is changed, using a plane in the vertical direction. With respect to each divided work region, the tool moving command data is generated by the same operation as that of Embodiments 1 to 4 described before.

As described above, according to Embodiment 5, the tool moving command data can be generated as follows. The work region is extracted from the three-dimensional work shape. The thus obtained work region is arbitrarily divided in accordance with the shape of the work region. Due to the foregoing, it is possible to generate the tool moving command data of high degree of freedom in accordance with the preference of an operator.

(EMBODIMENT 6)

Figure 18:
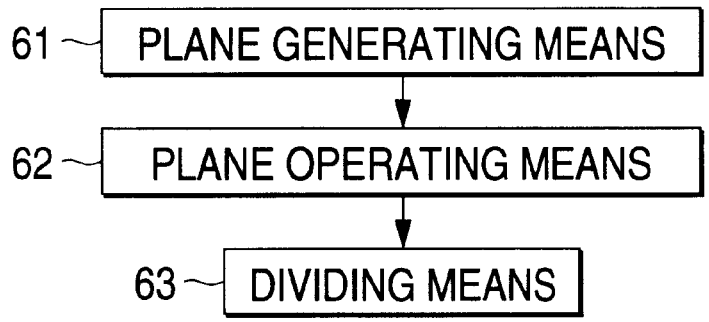
FIG. 18 is a block diagram showing a structure of the primary section of the numerical control apparatus of Embodiment 7 of the present invention.

FIG. 18 is a block diagram showing the structure of the primary section of the numerical control apparatus of Embodiment 6 of the present invention. In this embodiment, there is shown a specific example in which the work region is arbitrarily divided by a plane. In the view, reference numeral 61 is a plane generating means for generating a plane. Reference numeral 62 is a plane operating means for moving and turning a plane generated by the plane generating means 61. Reference numeral 63 is a dividing means for dividing a work region when the plane operated by the plane operating means 62 is used as a boundary.

Figure 19:
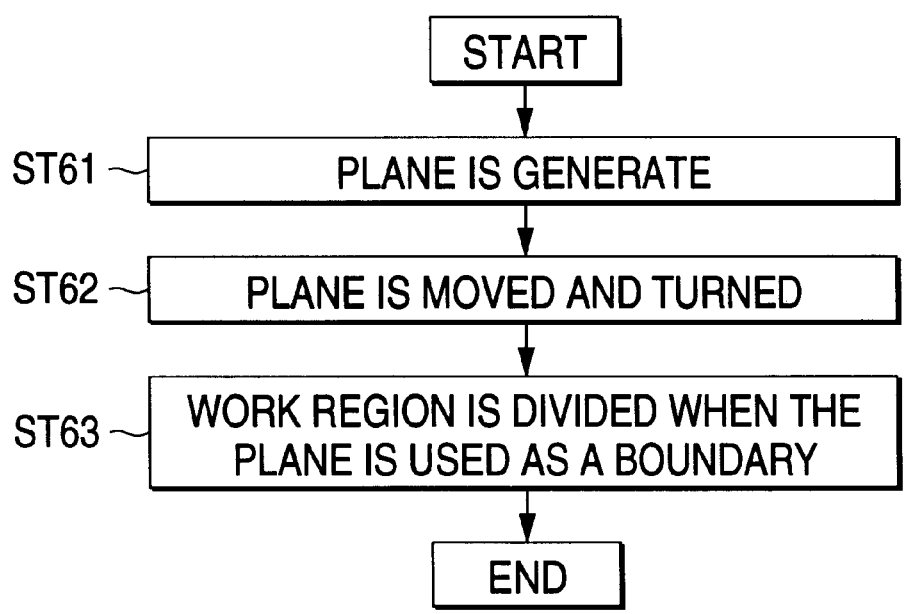
FIG. 19 is a flow chart showing an operation of the numerical control apparatus of Embodiment 6 of the present invention.
Figure 20A:
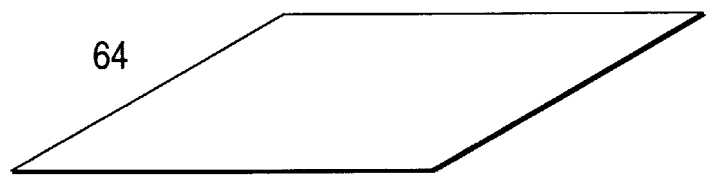
FIGS. 20A to 20C are schematic illustration specifically showing an operation of the numerical control apparatus Embodiment 6 of the present invention.
Figure 20B:
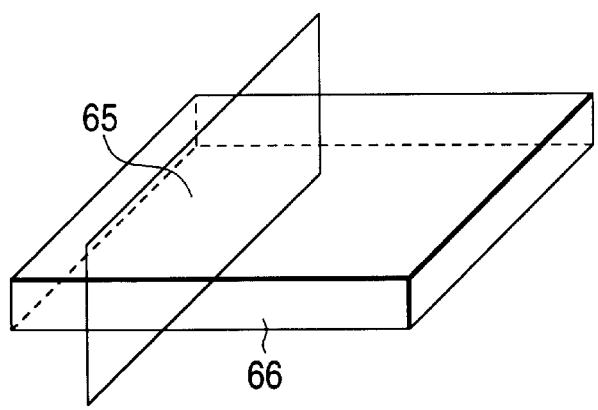
Figure 20C:
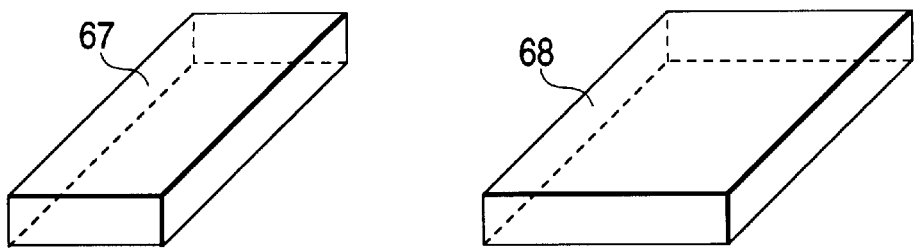

FIG. 19 is a flow chart showing the operation of the numerical control apparatus of Embodiment 6. FIG. 20 is a schematic illustration to specifically show the operation of the flow chart shown in FIG. 19. FIGS. 20A to 20C are views showing a process of dividing the shape.

Next, the operation will be explained as follows. In FIG. 19, first, a plane is generated (Step ST61). This state is shown in FIG. 20A. Reference numeral 64 in FIG. 20A represents a plane. Next, the plane is moved and turned (Step ST62). This state is shown in FIG. 20B. Reference numeral 65 in FIG. 20B represents a plane after it has been moved and turned. An objective work region to be divided is represented by reference numeral 66. The work region 66 is divided when the plane 65 is used as a boundary (Step ST63). This state is shown in FIG. 20C. The thus divided regions are represented by reference numerals 67 and 68 in FIG. 20C.

(EMBODIMENT 7)

Figure 21:
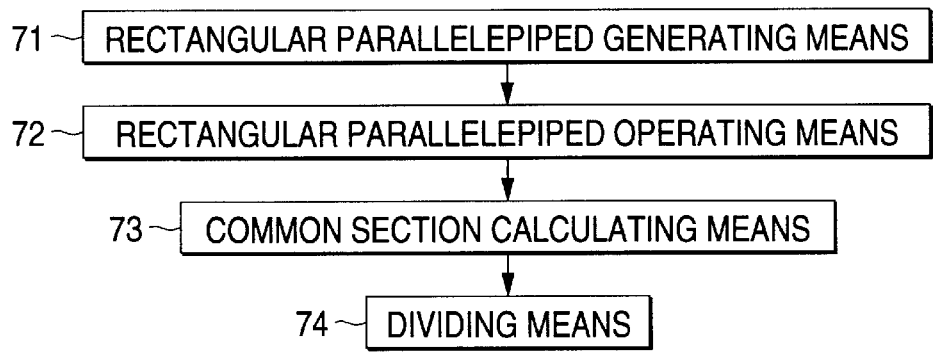
FIG. 21 is a block diagram showing a structure of the primary section of the numerical control apparatus of Embodiment 7 of the present invention.

FIG. 21 is a block diagram showing the primary section of the numerical control apparatus of Embodiment 7 of the present invention. In this embodiment, there is shown a specific example in which the work region is arbitrarily divided by using a rectangular parallelepiped including a cube. Reference numeral 71 is a rectangular parallelepiped generating means for generating a rectangular parallelepiped including a cube. Reference numeral 72 is a rectangular parallelepiped operating means for moving and turning a rectangular parallelepiped generated by the rectangular parallelepiped generating means 71. Reference numeral 73 is a common section calculating means for calculating a common section between the rectangular parallelepiped generated by the rectangular parallelepiped generating means 71 and operated by the rectangular parallelepiped operating means 72, and the work region. Reference numeral 75 is a dividing means for dividing the calculated common section and the work region.

Figure 22:
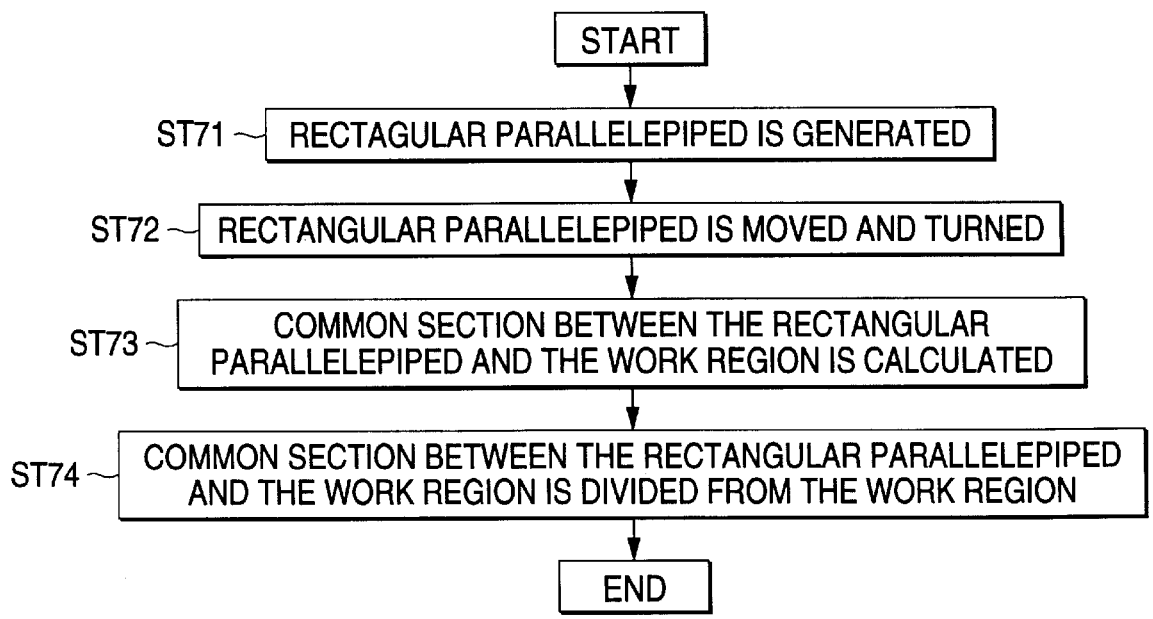
FIG. 22 is a flow chart showing an operation of the numerical control apparatus of Embodiment 7 of the present invention.
Figure 23A:
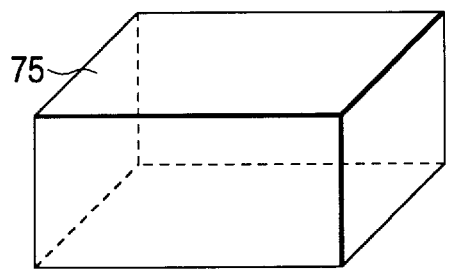
FIGS. 23A to 23C are schematic illustration specifically showing an operation of the numerical control apparatus of Embodiment 7 of the present invention.
Figure 23B:
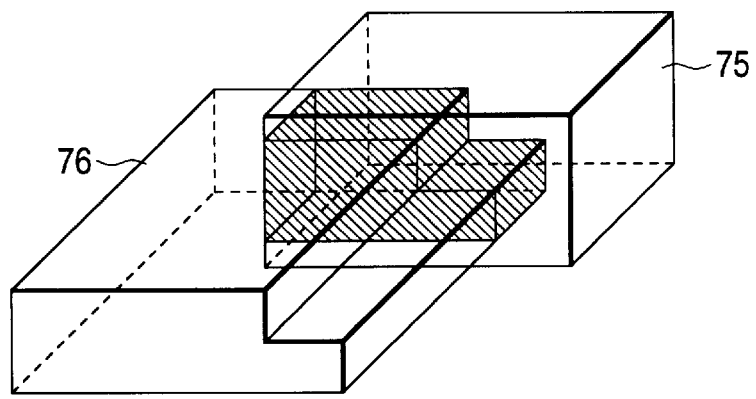
Figure 23C:
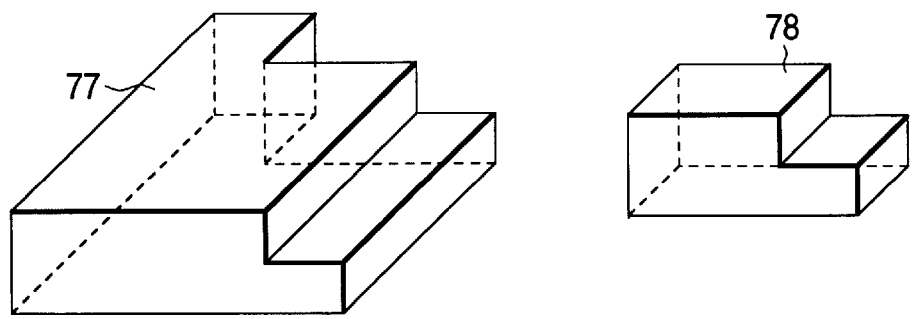

FIG. 22 is a flow chart showing the operation of the numerical control apparatus of Embodiment 7. FIG. 23 is a schematic illustration to specifically show the operation of the flow chart shown in FIG. 22. FIGS. 23A to 23C are views showing a process of dividing the shape.

Next, the operation will be explained below. In FIG. 22, first, a rectangular parallelepiped is generated (Step ST71). This state is shown in FIG. 23A. Reference numeral 75 in FIG. 23A is the rectangular parallelepiped. Next, the rectangular parallelepiped is moved and turned (Step ST72), and then a common section between the work region and the rectangular parallelepiped is calculated (Step ST73). This state is shown in FIG. 23B. Reference numeral 75 in FIG. 23B is the rectangular parallelepiped which has been turned and moved, and reference numeral 76 in FIG. 23B is the work region. Finally, the common section between the rectangular parallelepiped and the work region is divided from the work region (Step ST74). This state is shown in FIG. 23C. Reference numeral 78 in FIG. 23C is a common section between the divided rectangular parallelepiped and the work region. Reference numeral 77 in FIG. 23C is a divided work region.

(EMBODIMENT 8)

Figure 24:
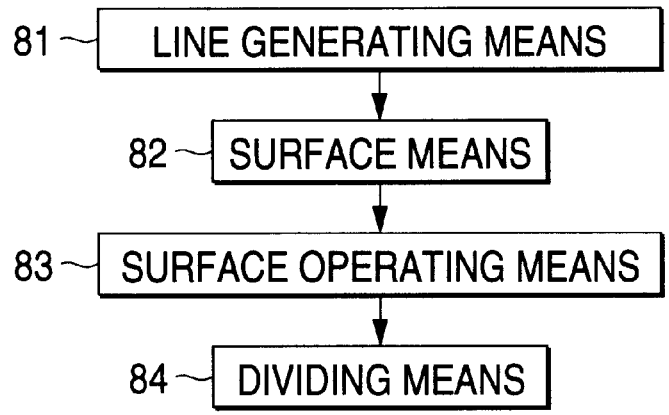
FIG. 24 is a block diagram showing a structure of the primary section of the numerical control apparatus of Embodiment 8 of the present invention.

FIG. 24 is a block diagram showing a primary section of the numerical control apparatus of Embodiment 8 of the present invention. In this embodiment, there is shown a specific example in which the work region is divided using an arbitrary surface including a curved surface when the work region is arbitrarily divided. In the view, reference numeral 81 is a line generating means for generating a line. Reference numeral 82 is a surface generating means for generating a surface using the line generated by the line generating means 81. Reference numeral 83 is a surface operating means for moving and turning the surface generated by the surface generating means 82. Reference numeral 84 is a shape dividing means for dividing a shape when the surface, which has been operated by the surface operating means 83, is used as a boundary.

Figure 25:
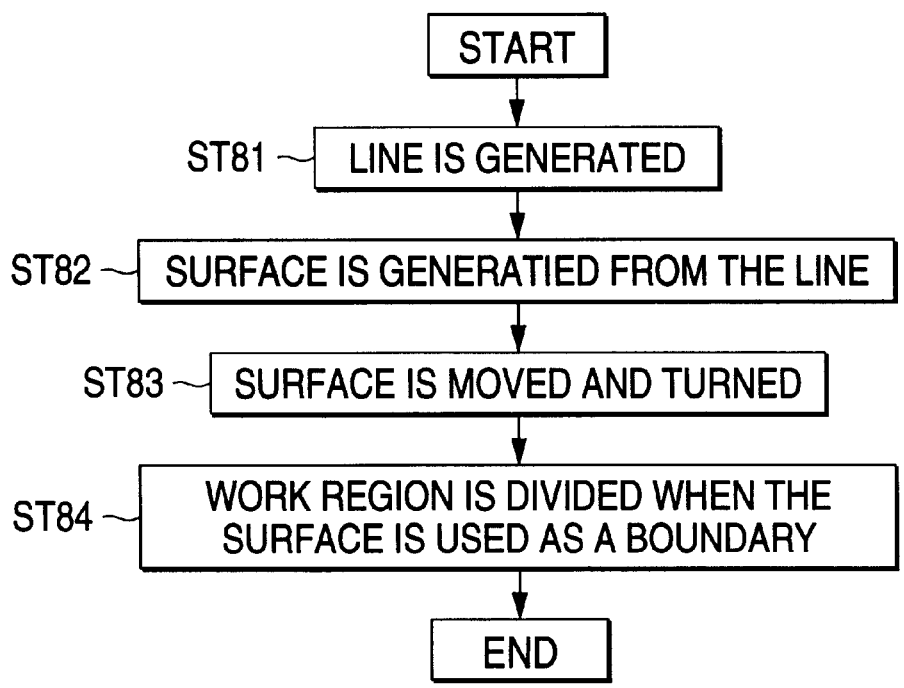
FIG. 25 is a flow chart showing an operation of the numerical control apparatus of Embodiment 8 of the present invention.
Figure 26A:
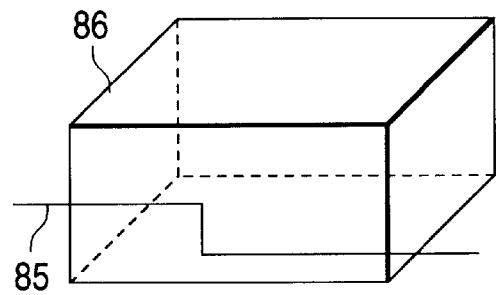
FIGS. 26A to 26C are schematic illustration specifically showing an operation of the numerical control apparatus of Embodiment 8 of the present invention.
Figure 26B:
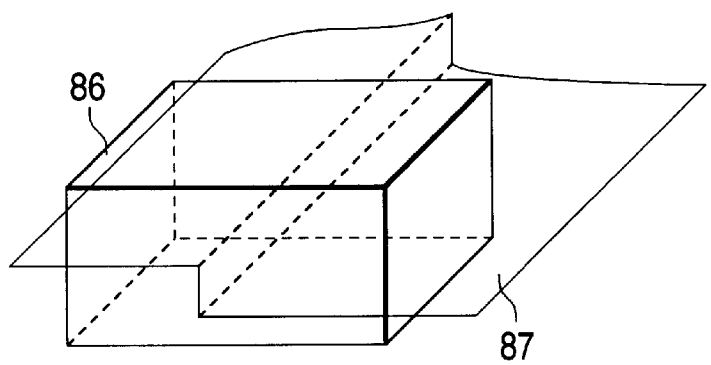
Figure 26C:
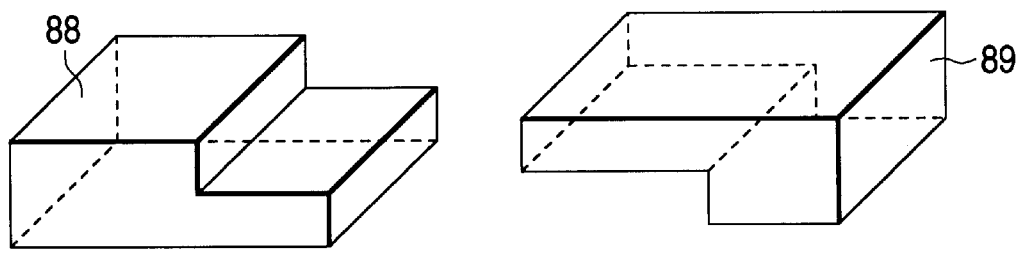

FIG. 25 is a flow chart showing the operation of the numerical control apparatus of Embodiment 8. FIG. 26 is a schematic illustration to specifically show the operation of the flow chart shown in FIG. 25. FIGS. 26A to 26C are views showing a process of dividing the shape.

Next, the operation will be explained below. In FIG. 25, first, a line is generated (Step ST81). This state is shown in FIG. 26A. Reference numeral 85 in FIG. 26A is the line. Reference numeral 86 in FIG. 26A is the work region. Next, a surface is generated by the line (Step ST82). This state is shown in FIG. 26B. The surface is moved and rotated (Step ST83). Reference numeral 87 in FIG. 26B is the surface. The shape is divided when this surface is used as a boundary (Step ST84). This state is shown in FIG. 26C. Reference numerals 88 and 89 in FIG. 26C are the divided regions.

(EMBODIMENT 9)

In Embodiments 1 to 5 described above, when the work region is extracted, the work region to be removed by machining is extracted by the three-dimensional work shape inputted into the shape inputting means 1 and also extracted by the shape of the workpiece inputted into the workpiece shape setting means 2. However, in this embodiment, the workpiece shape is not inputted from the outside but generated by the three-dimensional work shape inputted into the shape inputting means 1, and the work region is extracted by the generated shape and the three-dimensional work shape.

Figure 27:
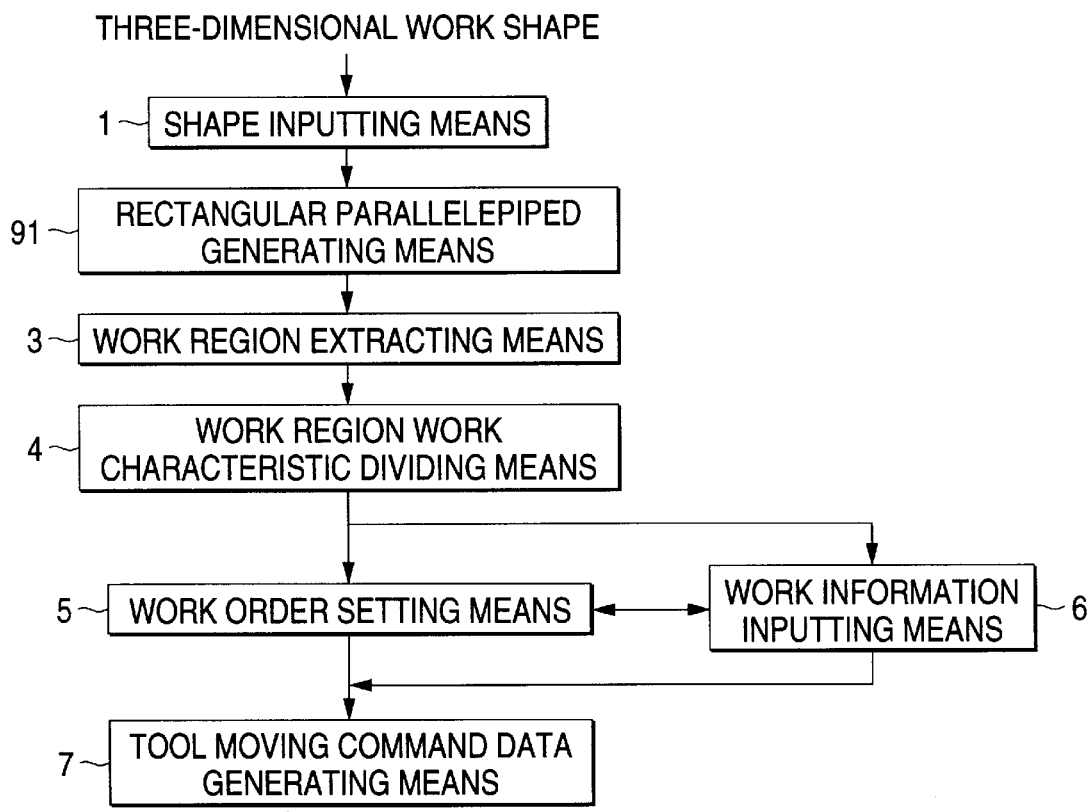
FIG. 27 is a block diagram showing a structure of the primary section of the numerical control apparatus of Embodiment 9 of the present invention.

FIG. 27 is a block diagram showing the structure of the primary section of the numerical control apparatus of Embodiment 9 of the present invention. Like reference characters are used to indicate like parts in FIGS. 1 and 27, and the same explanations are omitted here. Reference numeral 91 is a rectangular parallelepiped generating means for generating a rectangular parallelepiped including a cube in which the three-dimensional work shape inputted by the shape inputting means 1 is accommodated. Reference numeral 3 is a work region extracting means for extracting a work region when the three-dimensional work shape inputted by the shape inputting means 1 is subtracted from the rectangular parallelepiped including a cube generated by the rectangular parallelepiped generating means 91.

Figure 28:
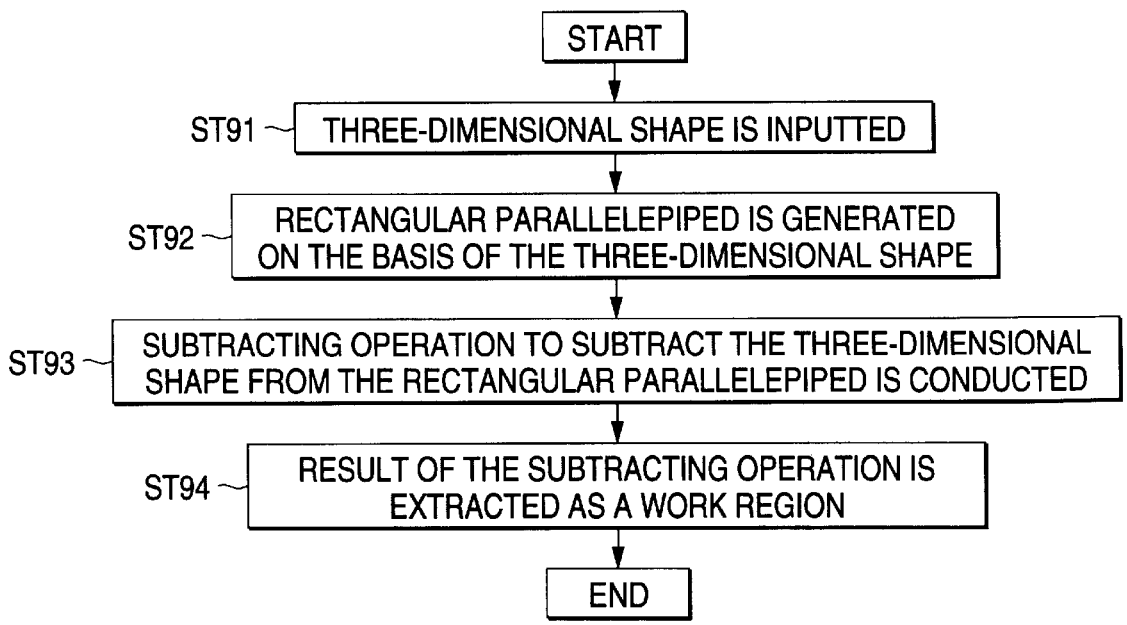
FIG. 28 is a flow chart showing an operation of the numerical control apparatus of Embodiment 9 of the present invention.

FIG. 28 is a flow chart showing the operation of extracting the work region in this numerical control apparatus. FIG. 29 is a schematic illustration to specifically explain the operation of the flow chart shown in FIG. 29.

Figure 29A:
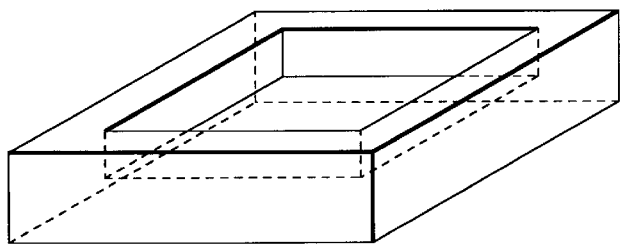
FIGS. 29A to 29C are schematic illustration specifically showing an operation of the numerical control apparatus of Embodiment 9 of the present invention.
Figure 29B:
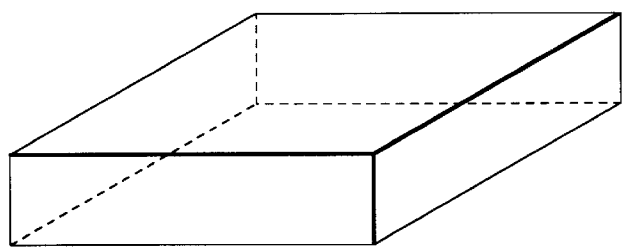
Figure 29C:
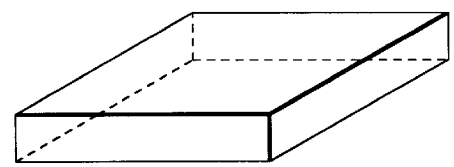

Next, the operation will be explained as follows. In the flow chart shown in FIG. 28, first, the three-dimensional work shape is inputted (Step ST91). This state is shown in FIG. 29A. Next, a rectangular parallelepiped including a cube in which the three-dimensional work shape is accommodated is generated (Step ST92). This state is shown in FIG. 29B. Next, a subtracting operation is conducted in such a manner that the three-dimensional work shape inputted in step ST91 is subtracted from the rectangular parallelepiped including a cube generated in Step ST92 (Step ST93). Finally, the shape generated in Step ST93 is extracted as a work region (Step ST94). This state is shown in FIG. 29C.

Therefore, according to this embodiment, only when the three-dimensional work shape is inputted, the shape of the work region can be generated.

In this embodiment, the work region is divided by the same work region work characteristic dividing means 4 as that of Embodiment 1. However, the method of dividing shown in Embodiments 2 to 5 may be adopted.

(EMBODIMENT 10)

Figure 30:
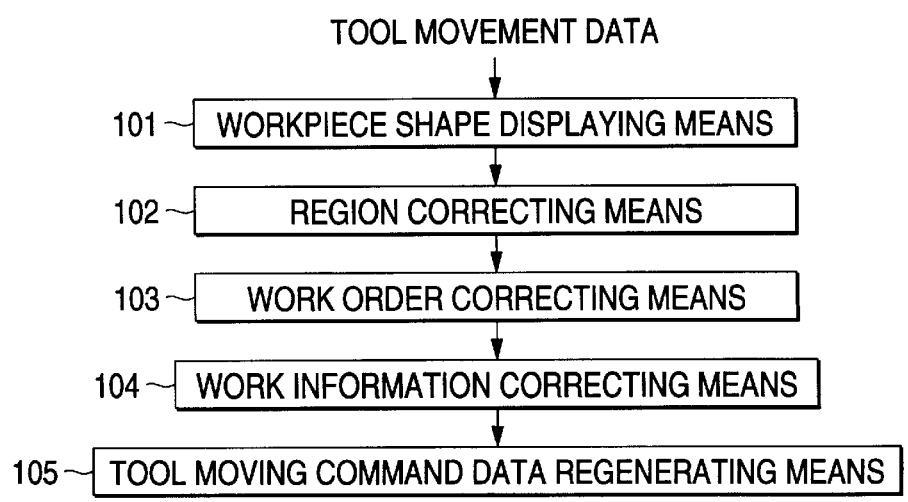
FIG. 30 is a block diagram showing a structure of the primary section of the numerical control apparatus of Embodiment 10 of the present invention.

FIG. 30 is a block diagram showing the primary section of the numerical control apparatus of Embodiment 10 of the present invention. In the view, reference numeral 101 is a workpiece shape display means for calculating and displaying a change in the shape of the workpiece when the tool is moved in accordance with the tool moving command data. Reference numeral 102 is a region correcting means for arbitrarily correcting each work region. Reference numeral 103 is a work order correcting means for correcting the order of work. Reference numeral 104 is a work information correcting means for correcting the work information. Reference numeral 105 is a tool moving command regenerating means for regenerating the tool moving command data in accordance with the corrected order of machining each work region and also in accordance with the work information.

Figure 31:
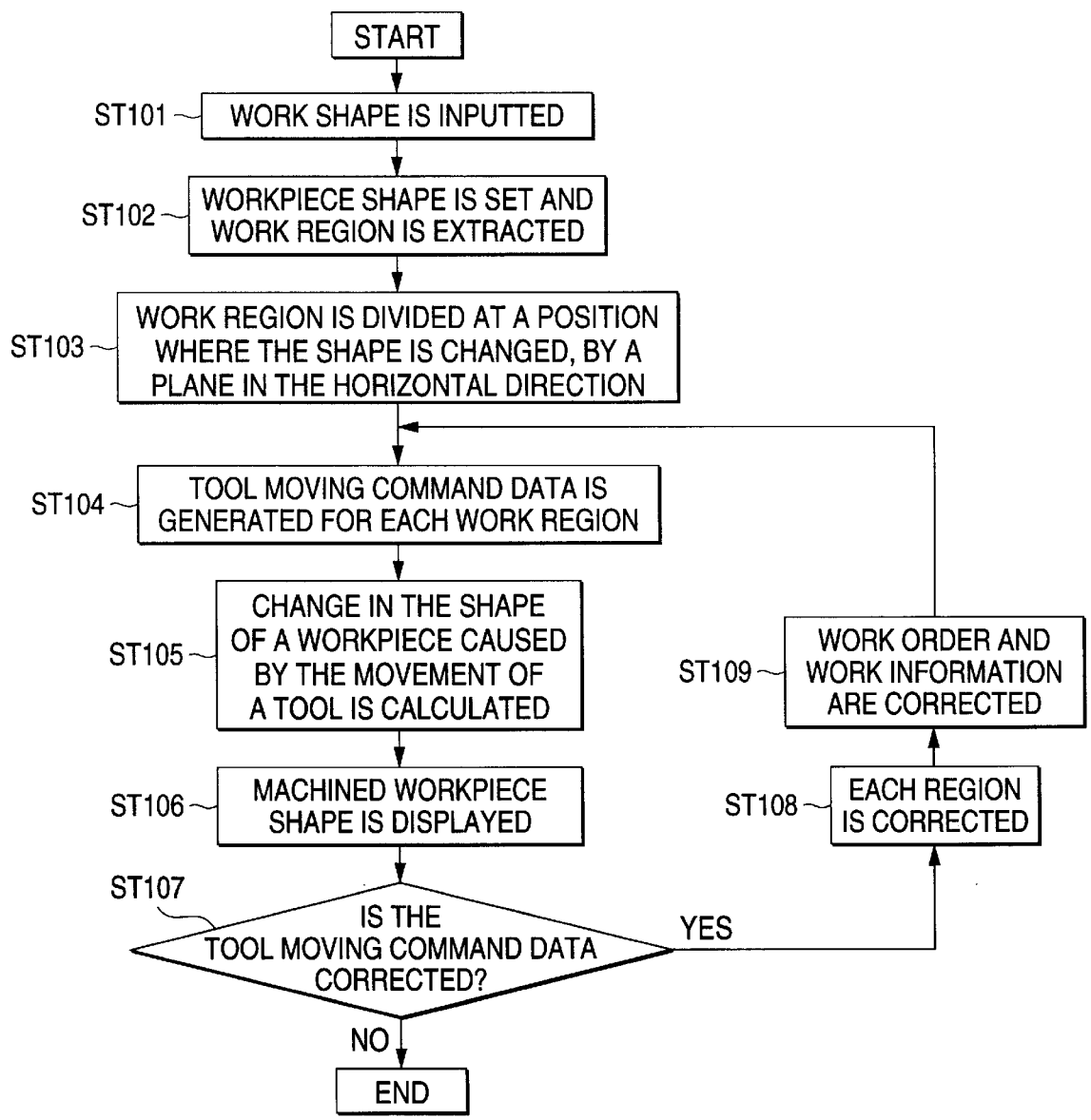
FIG. 31 is a flow chart showing an operation of the numerical control apparatus of Embodiment 10 of the present invention.
Figure 32A:
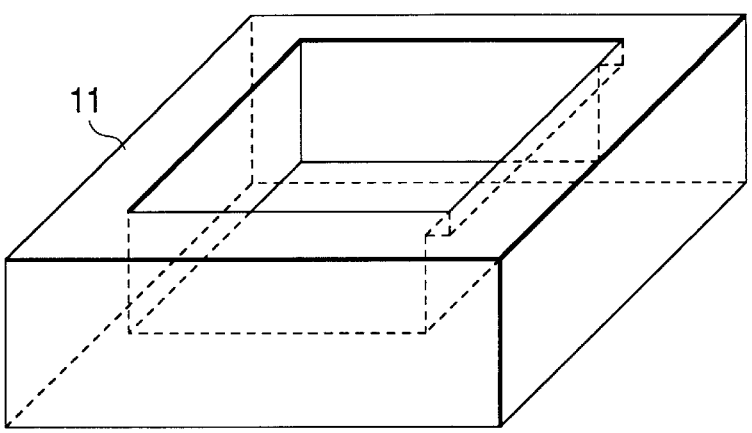
FIGS. 32A to 32D are schematic illustration specifically showing an operation of the numerical control apparatus of Embodiment 10 of the present invention.
Figure 32B:
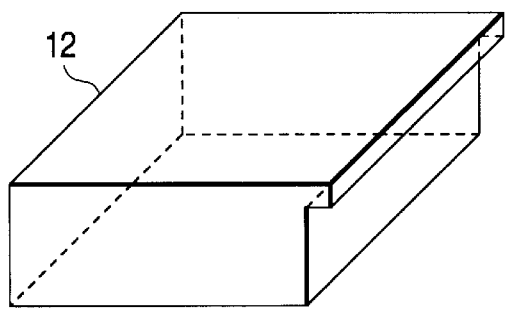
Figure 32C:
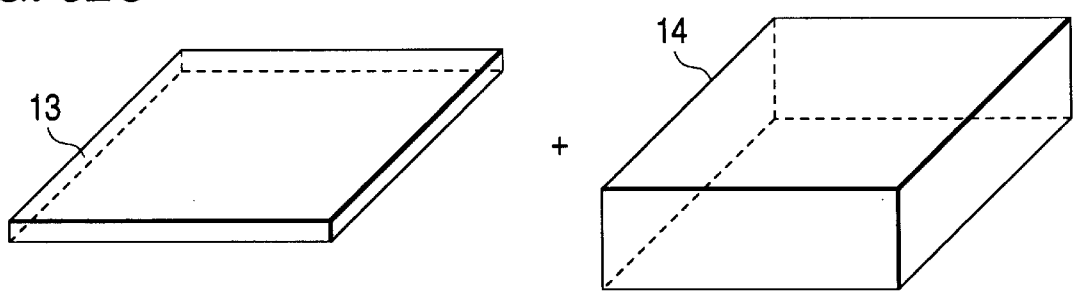
Figure 32D:
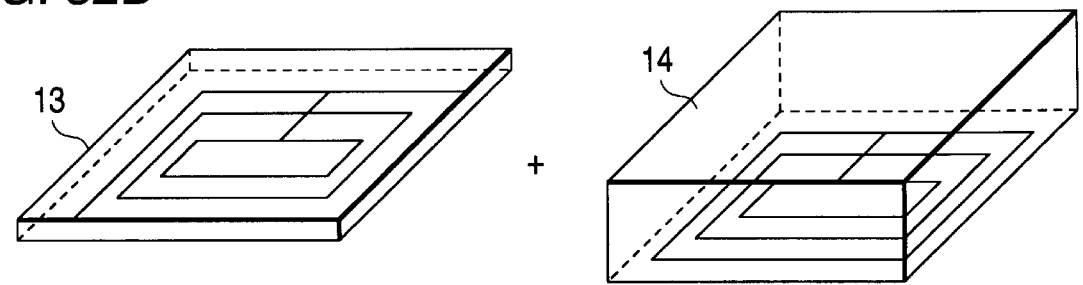
Figure 33A:
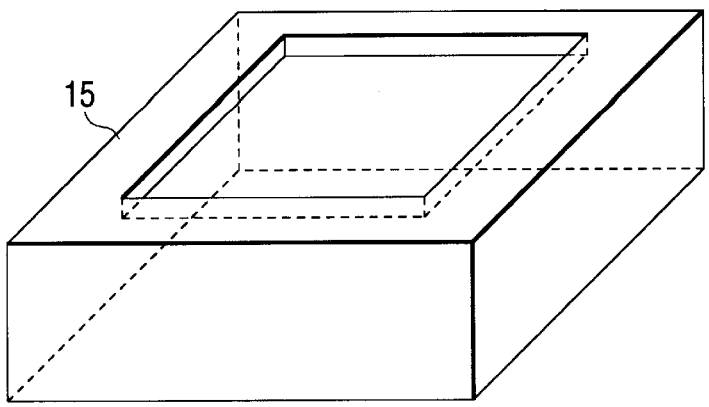
FIGS. 33A to 33D are schematic illustration specifically showing an operation of the numerical control apparatus of Embodiment 10 of the present invention.
Figure 33B:
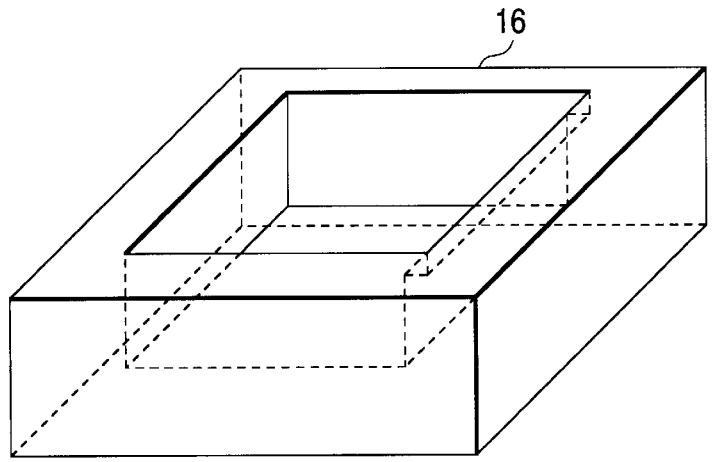
Figure 33C:
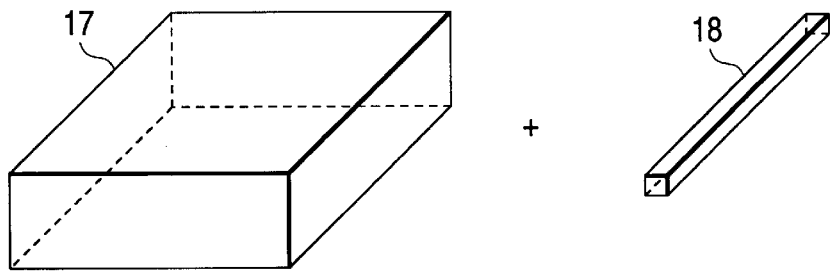
Figure 33D:
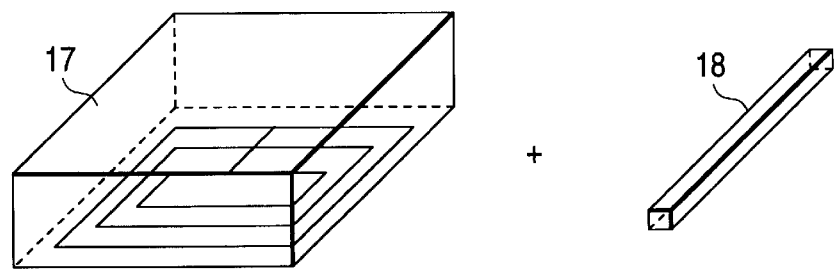
Figure 34A:
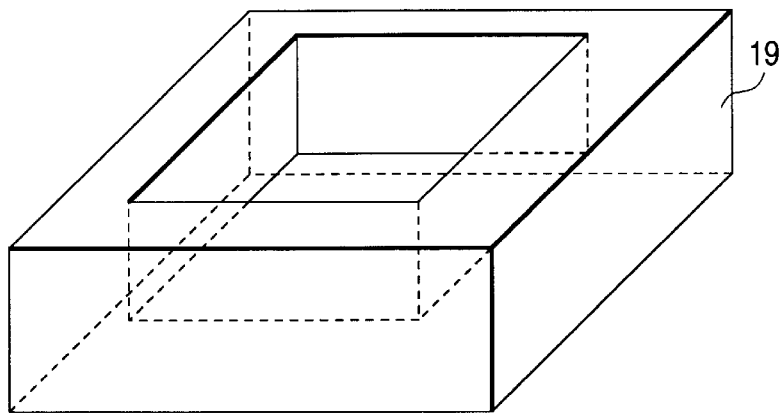
FIGS. 34A and 34B are schematic illustration specifically showing an operation of the numerical control apparatus of Embodiment 10 of the present invention.
Figure 34B:
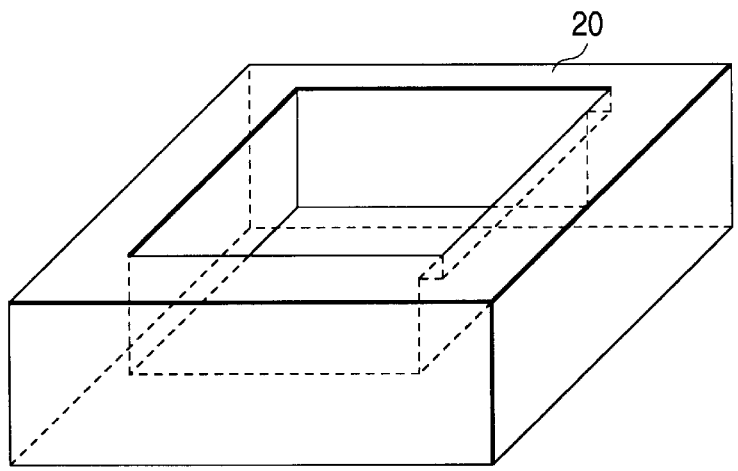

FIG. 31 is a flow chart showing the operation of this numerical control apparatus. FIGS. 32, 33 and 34 are schematic illustrations to specifically show the operation of the flow chart shown in FIG. 31. In FIG. 31, the three-dimensional work shape is inputted in Step ST101. Reference numeral 11 in FIG. 32A shows this state. In Step ST102, the workpiece shape is set, and the work region is extracted. Reference numeral 12 in FIG. 32B shows this extracted work region. In Step ST103, the work region is divided at a portion where the shape is changed, using a plane in the horizontal direction. Reference numerals 13 and 14 in FIG. 32C are the divided regions. In Step ST104, with respect to each divided work region, the tool moving command data is generated. FIG. 32D shows this state. In Step ST105, the shape of the workpiece, which is changed in accordance with the movement of the tool, is calculated. In Step ST106, the shape of the workpiece calculated in Step ST105 is displayed at any time. FIG. 33A shows a state of the workpiece, the shape of which is changed in accordance with the tool moving command data given to reference numeral 13 in FIG. 32D. FIG. 33B shows a state of the workpiece, the shape of which is changed in accordance with the tool moving command data given to reference numeral 14 in FIG. 32D after the tool has been moved in accordance with the tool moving command data given to reference numeral 13 in FIG. 32D. In Step ST107, according to the displayed image, the operator determines whether or not the tool moving command data is corrected. When the tool moving command data is corrected, the method of dividing the work region is corrected in Step ST108. Reference numerals 17 and 18 in FIG. 33C are the corrected shapes. In Step ST109, the work information and machining order are corrected, and the tool moving command data is generated again in Step ST104. This state is shown in FIG. 33D. In Step ST105, the shape of the workpiece which changes in accordance with the movement of the tool is calculated again. In Step ST106, the shape of the workpiece which has been calculated in Step ST105 is displayed at any time. FIG. 34A shows a state of the workpiece, the shape of which has been changed when the tool moving command data is given to the workpiece represented by reference numeral 17 in FIG. 33D. FIG. 34B shows a state of the workpiece, the shape of which has been changed when the tool moving command data is given to the workpiece represented by reference numeral 18 in FIG. 33D after the tool has been moved by the tool moving command data given to the workpiece represented by reference numeral 17 in FIG. 33D. When the tool moving command data is not corrected in Step ST107, the program is completed here.

Due to the foregoing, it is possible to effectively correct the tool moving command data in accordance with the change in the shape of the workpiece.

In this connection, when the work region is divided in the above embodiment, it is arbitrarily divided in a portion where the three-dimensional shape is changed, by using a plane in the horizontal direction or a plane in the vertical direction as a boundary. However, the method of division is not limited to the above specific method.

(EMBODIMENT 11)

Figure 35:
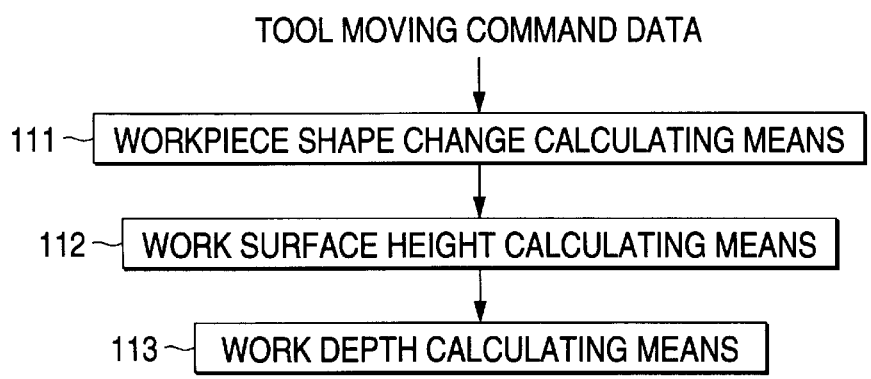
FIG. 35 is a block diagram showing a structure of the primary section of the numerical control apparatus of Embodiment 11 of the present invention.

FIG. 35 is a block diagram showing the primary section of the numerical control apparatus of Embodiment 11 of the present invention. In the view, reference numeral 111 is a workpiece shape change calculating means for calculating at any time the shape of the workpiece which changes by the movement of the tool in accordance with the tool moving command data. Reference numeral 112 is a work surface height calculating means for calculating the work surface height of the work region to be machined next, in accordance with the shape of the workpiece calculated by the workpiece shape change calculating means 111. Reference numeral 113 is a work depth calculating means for calculating the work depth of the work region to be machined next, in accordance with the shape of the workpiece calculated by the workpiece shape change calculating means 111.

Figure 36:
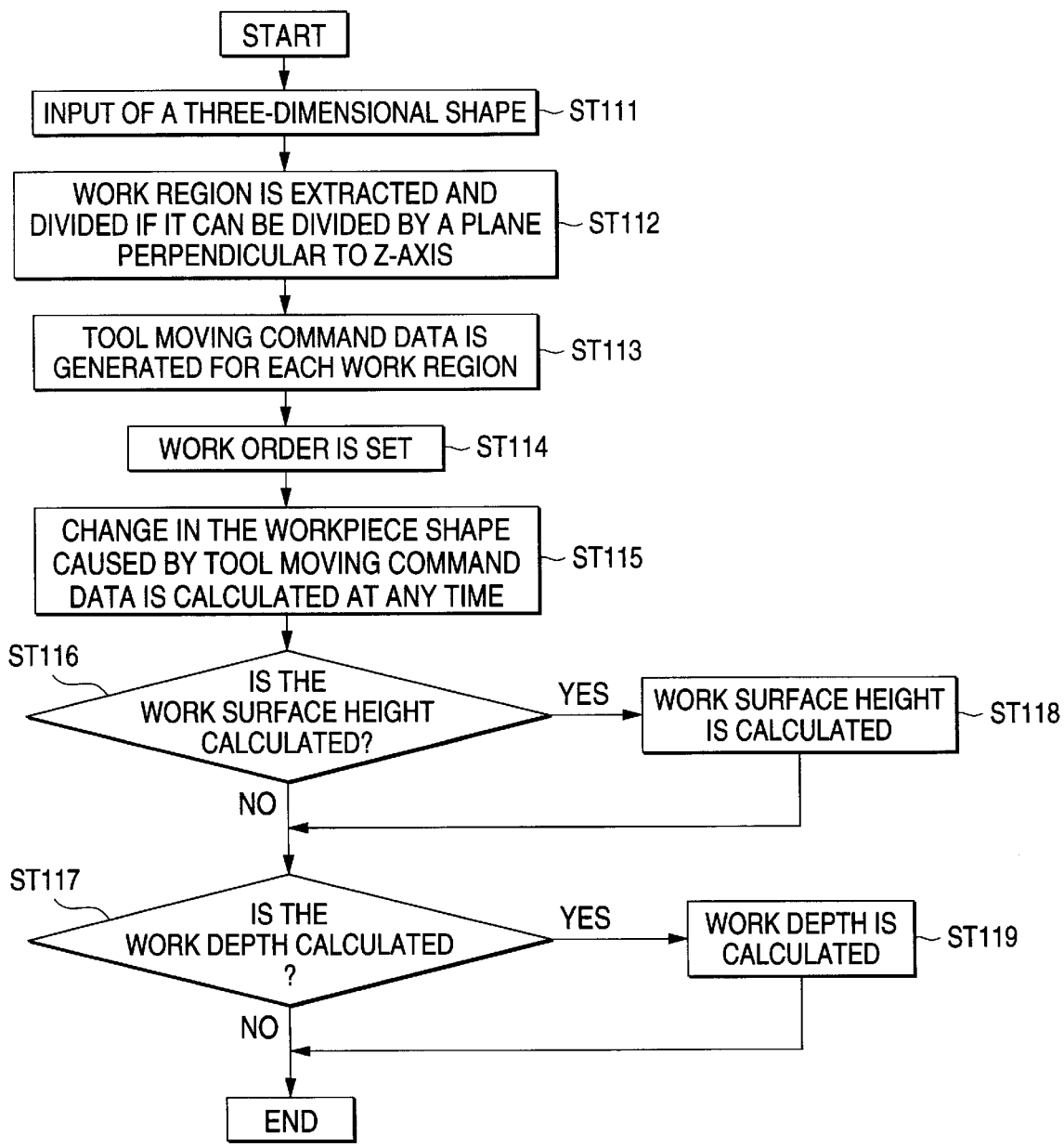
FIG. 36 is a flow chart showing an operation of the numerical control apparatus of Embodiment 11 of the present invention.
Figure 37A:
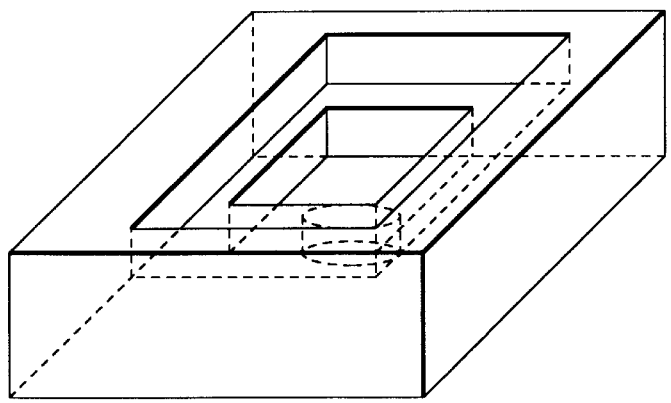
FIGS. 37A to 37C are schematic illustration specifically showing an operation of the numerical control apparatus of Embodiment 11 of the present invention.
Figure 37B:
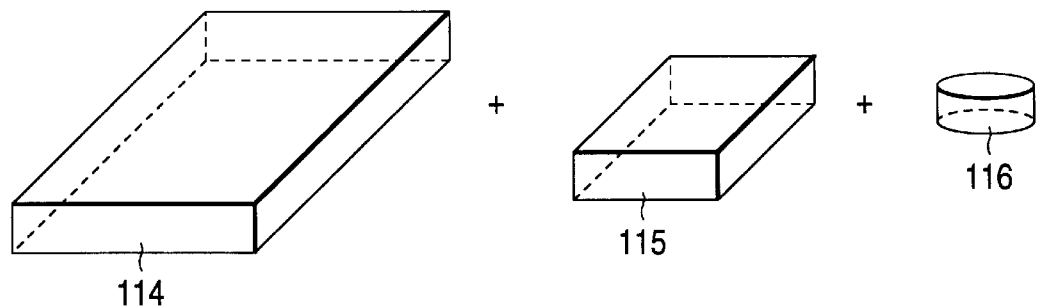
Figure 37C:
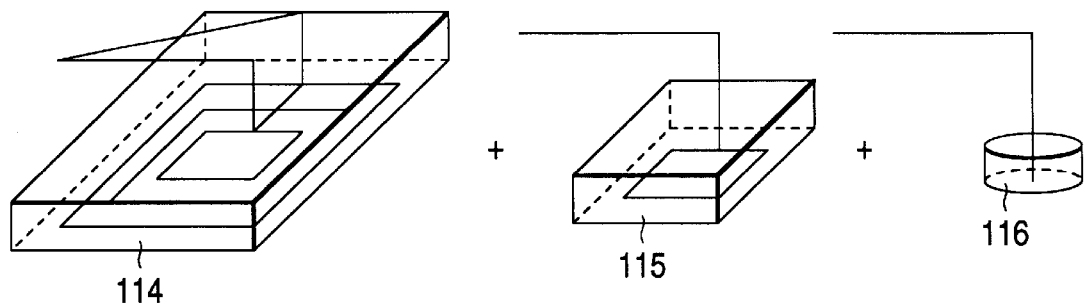
Figure 38A:
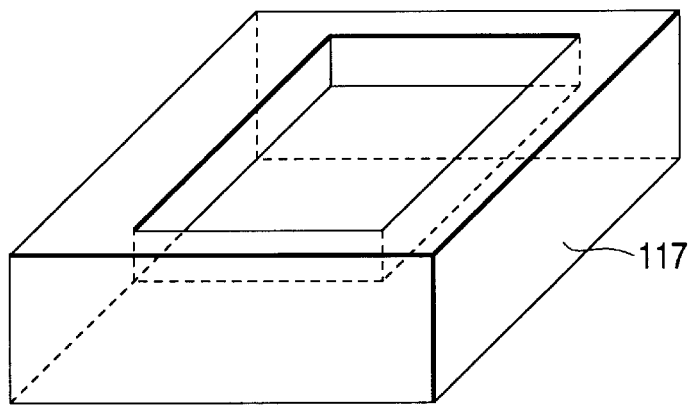
FIGS. 38A to 38C are schematic illustration specifically showing an operation of the numerical control apparatus of Embodiment 11 of the present invention.
Figure 38B:
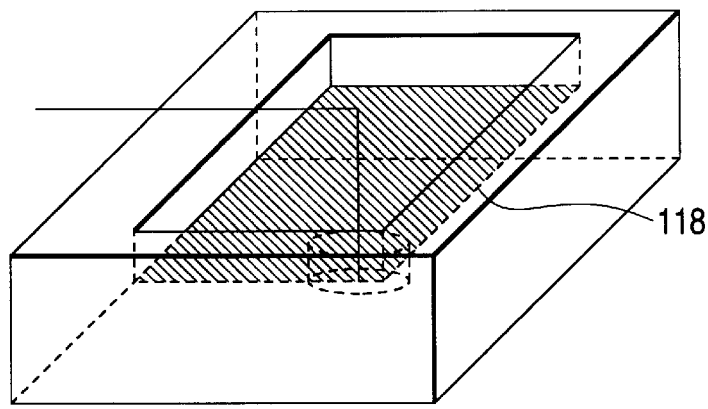
Figure 38C:
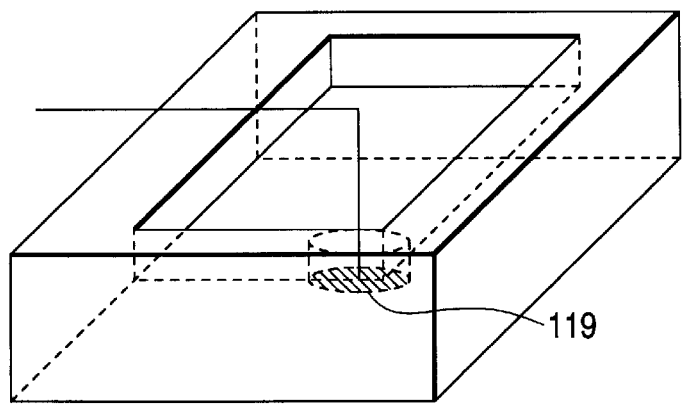

FIG. 36 is a flow chart showing the operation of this numerical control method. FIGS. 37 and 38 are schematic illustrations to specifically show the operation of the flow chart shown in FIG. 36. In Step ST111 shown in FIG. 36, the three-dimensional work shape is inputted. This state is shown in FIG. 37A. In Step ST112 shown in FIG. 36, after the shape of the workpiece has been set, the work region is extracted. After a plane perpendicular to Z-axis has been extracted from the work region, the work region is divided when it is possible to divide the region by the plane perpendicular to Z-axis that has been extracted in the work region. This state is shown in FIG. 37B. In FIG. 37B, reference numerals 114, 115 and 116 are regions that have been divided. In Step ST113, the work information is set with respect to each work region, so that the tool moving command data is generated. This state is shown in FIG. 37C. In Step ST114, the order of work is set. In FIG. 37C, the order of work is set as follows. After reference numeral 114 has been machined, reference numeral 116 is machined, and then reference numeral 115 is machined. In Step ST115, a change in the shape of the workpiece by the tool moving command data is calculated at any time. This state is shown in FIG. 38A. Reference numeral 117 in FIG. 38A shows a shape of the workpiece after the tool moving command data has been given to reference numeral 114 in FIG. 37C. When the next work region is machined, it is determined in Step ST116 whether or not the work surface height is calculated. In the case of calculation, that is, when the next work region has no work information about the work surface height, the program proceeds to Step ST118, and the work surface height is calculated. In the case of no calculation, that is, when the next work region has a piece of work information about the work surface height, the program proceeds to Step ST117. As described before, when reference numeral 116 is machined after reference numeral 114 in FIG. 37C has been machined, reference numeral 116 has no work information about the work surface height. Accordingly, in Step ST118, the work surface height of the objective work region 116 is calculated by the shape of the workpiece which has been calculated in Step ST115, and then the program proceeds to Step ST117. This state is shown in FIG. 38B. Reference numeral 118 is the work surface height. Next, in Step ST117, it is determined whether or not the work depth is calculated. When the next work region has no work information about the work depth, the program proceeds to Step ST119, and the work depth is calculated. When the next work region has a piece of work information about the work depth, the program is completed. In Step ST119, the work dept of the objective work region is calculated by the shape of the workpiece calculated in Step ST115, and then the program is completed. This state is shown in FIG. 38C. Reference numeral 119 is the work depth. When the work depth of the region of reference numeral 116 is calculated, the work depth from the work surface of reference numeral 119 is calculated.

As described above, in this embodiment, pieces of information such as the work surface height of the objective work surface and the work depth, which change at any time, can be calculated. Accordingly, the correct work information can be effectively generated.

As described above, according to the first aspect of the present invention, there is provided a numerical control apparatus comprising: a shape inputting means for inputting a three-dimensional shape to be machined; a workpiece shape setting means for setting the shape of a workpiece; a work region extracting means for extracting a work region by the three-dimensional shape to be machined inputted by the shape inputting means and by the shape of the workpiece which has been set by the workpiece shape setting means; a work region dividing means for dividing the work region extracted by the work region extracting means; a work order setting means for setting the order of work the regions to be machined divided by the work region dividing means; a work information inputting means for inputting the work information of each work region; and a tool moving command data generating means for generating the tool moving command data by the order of work in each work region and the work information. Accordingly, it is possible to realize a system in which the tool moving command data can be directly generated by the three-dimensional work shape that has been inputted into the numerical control apparatus.

According to the second aspect of the present invention, there is provided a numerical control apparatus, the work region dividing means including a work region work characteristic dividing means for dividing the work region into a spot work, a contour work and a region work in accordance with the characteristic of the work region. Accordingly, the work information can be effectively set, and the tool moving command data can be effectively generated.

According to the third aspect of the present invention, there is provided a numerical control apparatus, the work region dividing means including: a work region fractionalizing means for fractionalizing the work region by the characteristic of the three-dimensional work shape inputted by the shape inputting means; and a region combining means for arbitrarily combining the regions divided by the work region fractionalizing means. Accordingly, it is possible to generate the tool moving command data, the degree of freedom of which is high.

According to the fourth aspect of the present invention, there is provided a numerical control apparatus, in which the work region fractionalizing means extends the surfaces composing the three-dimensional work shape inputted by the shape inputting means and divides the work region when the extended surface interfering with the work region extracted by the work region extracting means is used as a boundary. Accordingly, it is possible to fractionalize each work region easily.

According to the fifth aspect of the present invention, there is provided a numerical control apparatus, the work region dividing means including a work region arbitrarily dividing means for arbitrarily dividing the work region. Accordingly, it is possible to generate the tool moving command data, the degree of freedom of which is high.

According to the sixth aspect of the present invention, there is provided a numerical control apparatus, the work region dividing means including a work region arbitrarily dividing means for arbitrarily dividing the work region in accordance with the shape of the work region. Accordingly, it is possible to generate the tool moving command data, the degree of freedom of which is high.

According to the seventh aspect of the present invention, there is provided a numerical control apparatus, the work region arbitrarily dividing means including: a plane generating means for generating a plane; a plane operating means for arbitrarily moving and turning a plane generated by the plane generating means; and a dividing means for dividing the work region when the plane which has been set by the plane generating means and the plane operating means is used as a boundary. Accordingly, the work region can be arbitrarily divided.

According to the eighth aspect of the present invention, there is provided a numerical control apparatus, the work region arbitrarily dividing means including: a rectangular parallelepiped generating means for generating a rectangular parallelepiped; a rectangular parallelepiped operating means for arbitrarily moving and turning the rectangular parallelepiped generated by the rectangular parallelepiped generating means; a common section calculating means for calculating a common section between the rectangular parallelepiped which has been set by the rectangular parallelepiped operating means and the work region; and a dividing means for dividing the work region in the common section. Accordingly, the work region can be arbitrarily divided.

According to the ninth aspect of the present invention, there is provided a numerical control apparatus, the work region arbitrarily dividing means including: a line generating means for generating an arbitrary line; a surface generating means for generating an arbitrary surface with respect to the line generated by the line generating means; a surface operating means for moving and turning the surface generated by the surface generating means; and a dividing means for dividing the work region when the surface which has been set by the surface operating means is used as a boundary surface.

According to the tenth aspect of the present invention, there is provided a numerical control apparatus, the workpiece shape setting means including a rectangular parallelepiped generating means for generating a rectangular parallelepiped containing the overall three-dimensional workpiece shape by the three-dimensional work shape inputted by the shape inputting means, wherein the work region extracting means extracts a work region by subtracting the three-dimensional work shape from the rectangular parallelepiped generated by the rectangular parallelepiped generating means. Accordingly, only when the three-dimensional work shape is inputted, the shape of the work region can be generated.

According to the eleventh aspect of the present invention, there is provided a numerical control apparatus, further comprising: a shape display means for calculating and displaying a change in the shape of the workpiece at any time when the tool is moved in accordance with the generated tool moving command data; a region correcting means for arbitrarily correcting the work region; a work order correcting means for correcting the order of work; a work information correcting means for correcting the work information; and a tool moving command data regenerating means for regenerating the tool moving command data in accordance with the corrected work order of the regions to be machined and also in accordance with the work information. Accordingly, it is possible to correct the tool moving command data effectively in accordance with a change in the shape of the workpiece.

According to the twelfth aspect of the present invention, there is provided a numerical control apparatus, further comprising: a shape change calculating means for calculating a change in the shape of the workpiece at any time when the tool is moved in accordance with the generated tool moving command data; a work surface height calculating means for calculating a height of the work surface in the work region next, in accordance with the shape calculated by the shape change calculating means; and a work depth calculating means for calculating the work depth of the work region to be machined next, in accordance with the shape calculated by the shape change calculating means. Accordingly, the correct work information can be effectively generated.

What is claimed is:

1. A numerical control apparatus in which the inputted numerical data is decoded, each section of said numerical control apparatus is controlled in accordance with the result of decoding, and a workpiece is machined according to the numerical data, comprising:

a shape inputting means for inputting a three-dimensional shape to be machined;

a workpiece shape setting means for setting the shape of a workpiece;

a work region extracting means for extracting a work region by the three-dimensional work shape inputted by the shape inputting means and by the shape of the workpiece which has been set by the workpiece shape setting means;

a work region dividing means for dividing the work region extracted by the work region extracting means;

a work order setting means for setting the order of machining the work regions divided by the work region dividing means;

a work information inputting means for inputting the work information of each work region; and a tool moving command data generating means for generating the tool moving command data by the order of machining in each work region and the work informations wherein the work region dividing means includes a work region work characteristic dividing means for dividing the work region into spot work, contour work, and region work in accordance with characteristics of the work region.

2. The numerical control apparatus of claim 1, wherein the work region dividing means includes:

a work region fractionalizing means for fractionalizing the work region by the characteristic of the three-dimensional work shape inputted by said shape inputting means; and a region combining means for arbitrarily combining the regions divided by said work region fractionalizing means.

3. The numerical control apparatus of claim 2, wherein the work region fractionalizing means extends the surfaces composing the three-dimensional work shape inputted by said shape inputting means, and divides the work region when the extended surface interfering with the work region extracted by said work region extracting means is used as a boundary.

4. The numerical control apparatus of claim 1, wherein said work region dividing means includes:

a work region arbitrarily dividing means for arbitrarily dividing the work region.

5. The numerical control apparatus of claim 1, wherein said work region dividing means includes:

a work region arbitrary dividing means for arbitrarily dividing the work region in accordance with the shape of the work region.

6. The numerical control apparatus of claim 5, wherein the work region arbitrarily dividing means includes:

a plane generating means for generating a plane;

a plane operating means for arbitrarily moving and turning a plane generated by said plane generating means; and a dividing means for dividing the work region when the plane which has been set by said plane generating means and said plane operating means is used as a boundary.

7. A numerical control apparatus in which the inputted numerical data is decoded, each section of said numerical control apparatus is controlled in accordance with the result of decoding, and a workpiece is machined according to the numerical data, comprising:

a shape inputting means for inputting a three-dimensional shape to be machined;

a workpiece shape setting means for setting the shape of a workpiece;

a work region extracting means for extracting a work region by the three-dimensional work shape inputted by the shape inputting means and by the shape of the workpiece which has been set by the workpiece shape setting means;

a work region dividing means for dividing the work region extracted by the work region extracting means;

a work order setting means for setting the order of machining the work regions divided by the work region dividing means;

a work information inputting means for inputting the work information of each work region; and a tool moving command data generating means for generating the tool moving command data by the order of machining in each work region and the work information;

wherein said work region dividing means includes a work region arbitrary dividing means for arbitrarily dividing the work region; and wherein the work region arbitrary dividing means includes:

a rectangular parallelepiped generating means for generating a rectangular parallelepiped;

a rectangular parallelepiped operating means for arbitrarily moving and turning the rectangular parallelepiped generated by said rectangular parallelepiped generating means;

a common section calculating means for calculating a common section between the rectangular parallelepiped which has been set by said rectangular parallelepiped operating means and the work region; and a dividing means for dividing the work region in the common section.

8. The numerical control apparatus of claim 4, wherein said work region arbitrarily dividing means includes:

a line generating means for generating an arbitrary line;

a surface generating means for generating an arbitrary surface with respect to the line generated by said line generating means;

a surface operating means for moving and turning the surface generated by said surface generating means; and a dividing means for dividing the work region when the surface which has been set by said surface operating means is used as a boundary surface.

9. A numerical control apparatus in which the inputted numerical data is decoded, each section of said numerical control apparatus is controlled in accordance with the result of decoding, and a workpiece is machined according to the numerical data, comprising:

a shape inputting means for inputting a three-dimensional shape to be machined;

a workpiece shape setting means for setting the shape of a workpiece;

a work region extracting means for extracting a work region by the three-dimensional work shape inputted by the shape inputting means and by the shape of the workpiece which has been set by the workpiece shape setting means;

a work region dividing means for dividing the work region extracted by the work region extracting means;

a work order setting means for setting the order of machining the work regions divided by the work region dividing means;

a work information inputting means for inputting the work information of each work region; and a tool moving command data generating means for generating the tool moving command data by the order of machining in each work region and the work information;

wherein said workpiece shape setting means includes a rectangular parallelepiped generating means for generating a rectangular parallelepiped containing the overall three-dimensional workpiece shape by the three-dimensional work shape inputted by said shape inputting means, and wherein said work region extracting means extracts a work region by subtracting the three-dimensional work shape from the rectangular parallelepiped generated by said rectangular parallelepiped generating means.

10. The numerical control apparatus of claim 1, further comprising:

a shape display means for calculating and displaying a change in the shape of the workpiece at any time when the tool is moved in accordance with the generated tool moving command data;

a region correcting means for arbitrarily correcting the work region;

a work order correcting means for correcting the order of machining;

a work information correcting means for correcting the work information; and a tool moving command data regenerating means for regenerating the tool moving command data in accordance with the corrected work order of the work regions and also in accordance with the work information.

11. The numerical control apparatus of claim 1, further comprising:

a shape change calculating means for calculating a change in the shape of the workpiece at any time when the tool is moved in accordance with the generated tool moving command data;

a work surface height calculating means for calculating a height of the work surface in the work region next, in accordance with the shape calculated by said shape change calculating means; and a work depth calculating means for calculating the work depth of the work region to be machined next, in accordance with the shape calculated by said shape change calculating means.

12. A numerical control method in which inputted numerical data is decoded, machine elements are controlled in accordance with the result of the decoding, and a workpiece is machined according to the numerical data, comprising the steps of:

inputting a three-dimensional shape to be machined;

setting the shape of a workpiece;

extracting a work region from the three-dimensional work shape and the shape of the workpiece;

dividing up the work region into separate work regions;

setting the order of the machining of the divided work regions;

inputting work information for each work region; and generating tool moving command data using the order of the machining in each work region and the work information;

wherein the step of dividing up the work region comprises dividing the work region into spot work, contour work, and region work in accordance with characteristics of the work region.

13. The numerical controlling method according to the claim 12 wherein the method further comprises:

calculating and displaying a change in the shape of the workpiece in accordance with the generated tool moving command data;

correcting the work region, the work order, and the work information; and regenerating the tool moving command data in accordance with the corrected work order of the corrected work regions and also in accordance with the corrected work information.

* * * * *